US012646023B1

(12) United States Patent
Smith et al.

(10) Patent No.: US 12,646,023 B1
(45) Date of Patent: Jun. 2, 2026

(54) SITE LOCATION FOR AN INTERACTIVE MACHINE

(71) Applicant: UIPCO, LLC, San Antonio, TX (US)

(72) Inventors: Elizabeth K. Smith, Fredericksburg, TX (US); Arthur Quentin Smith, Fredericksburg, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 353 days.

(21) Appl. No.: 18/053,962

(22) Filed: Nov. 9, 2022

Related U.S. Application Data

(63) Continuation-in-part of application No. 16/457,028, filed on Jun. 28, 2019, now abandoned.

(60) Provisional application No. 62/751,029, filed on Oct. 26, 2018.

(51) Int. Cl.
 *G06Q 10/0631* (2023.01)

(52) U.S. Cl.
 CPC .............................. *G06Q 10/06315* (2013.01)

(58) Field of Classification Search
 CPC ............... G06Q 30/0205; G06Q 10/04; G06Q 10/06313; G06Q 30/0201; G06Q 10/06315
 USPC ............. 705/7.34, 7.31, 43, 7.29, 7.36, 7.37
 See application file for complete search history.

(56) References Cited

U.S. PATENT DOCUMENTS

| | | | |
|---|---|---|---|
| 7,412,398 B1 | 8/2008 | Bailey | |
| 8,275,650 B1 | 9/2012 | Corbett | |
| 8,336,766 B1 * | 12/2012 | Miller | G07F 19/2055 |
| | | | 235/379 |
| 8,725,553 B1 | 5/2014 | Turley | |
| 9,165,304 B2 * | 10/2015 | Weiss | G06Q 30/02 |
| 9,290,927 B1 | 3/2016 | Sheley | |
| 9,760,840 B1 | 9/2017 | Tyagi | |
| 10,248,700 B2 * | 4/2019 | Diamond | G06F 16/26 |
| 10,902,445 B2 * | 1/2021 | Elias | G06F 7/026 |
| 2005/0096972 A1 | 5/2005 | Baechtiger | |
| 2009/0076888 A1 * | 3/2009 | Oster | G06Q 10/10 |
| | | | 705/7.34 |
| 2011/0099048 A1 * | 4/2011 | Weiss | H04W 4/029 |
| | | | 705/7.34 |
| 2011/0161119 A1 * | 6/2011 | Collins | G06Q 40/08 |
| | | | 705/4 |

(Continued)

OTHER PUBLICATIONS

Non-Final Office Action mailed Dec. 10, 2020 for U.S. Appl. No. 16/457,028.

(Continued)

*Primary Examiner* — Rutao Wu
*Assistant Examiner* — Letoria G Knight
(74) *Attorney, Agent, or Firm* — Plumsea Law Group, LLC

(57) ABSTRACT

A method for selecting a location for an interactive machine. A minimum number of transactions at the interactive machine is established and first region having a number of potential users of the interactive machine to enter into the minimum number of transactions present in the first region is identified. Identified movements of the potential users of the interactive machine present in the first region are tracked on an electronic map and used in combination with information such as aggregated wealth information, social profile information, affinity group information, crime information, and financial aspects of installing the interactive machine to identify a potential location for the machine in the first region.

20 Claims, 27 Drawing Sheets

(56) References Cited

U.S. PATENT DOCUMENTS

| | | | |
|---|---|---|---|
| 2013/0073388 A1* | 3/2013 | Heath | G06Q 50/01 |
| | | | 705/14.53 |
| 2016/0012411 A1 | 1/2016 | Kursun | |
| 2016/0117688 A1* | 4/2016 | Ghosh | H04W 4/021 |
| | | | 705/7.29 |
| 2016/0239857 A1 | 8/2016 | Milton | |
| 2018/0047001 A1 | 2/2018 | Tiwari | |
| 2019/0130426 A1 | 5/2019 | Milton | |
| 2019/0130427 A1 | 5/2019 | Sugimoto | |
| 2019/0242720 A1 | 8/2019 | Shapiro | |
| 2020/0013102 A1* | 1/2020 | Yeldham | G06F 16/29 |

OTHER PUBLICATIONS

Final Office Action mailed May 20, 2021 for U.S. Appl. No. 16/457,028.

Non-Final Office Action mailed Dec. 20, 2021 for U.S. Appl. No. 16/457,028.

A. Qadrei and S. Habib, "Allocation of Heterogeneous Banks' Automated Teller Machines," 2009 First International Conference on Intensive Applications and Services, 2009, pp. 16-21, doi: 10.1109/INTENSIVE.2009.15. (Year: 2009).

Final Office Action mailed Aug. 10, 2022 for U.S. Appl. No. 16/457,028.

* cited by examiner

ESTABLISH MINIMUM NUMBER
OF TRANSACTIONS AT A MACHINE ⟋ 102

IDENTIFY A REGION HAVING
SUFFICIENT NUMBER OF POTENTIAL
USERS RESIDENT IN THE REGION ⟋ 104

IDENTIFY MOVEMENT OF
POTENTIAL USERS IN THE REGION
TO IDENTIFY POTENTIAL
LOCATIONS FOR THE MACHINE ⟋ 106

POTENTIAL LOCATIONS
IDENTIFIED ⟋ 108

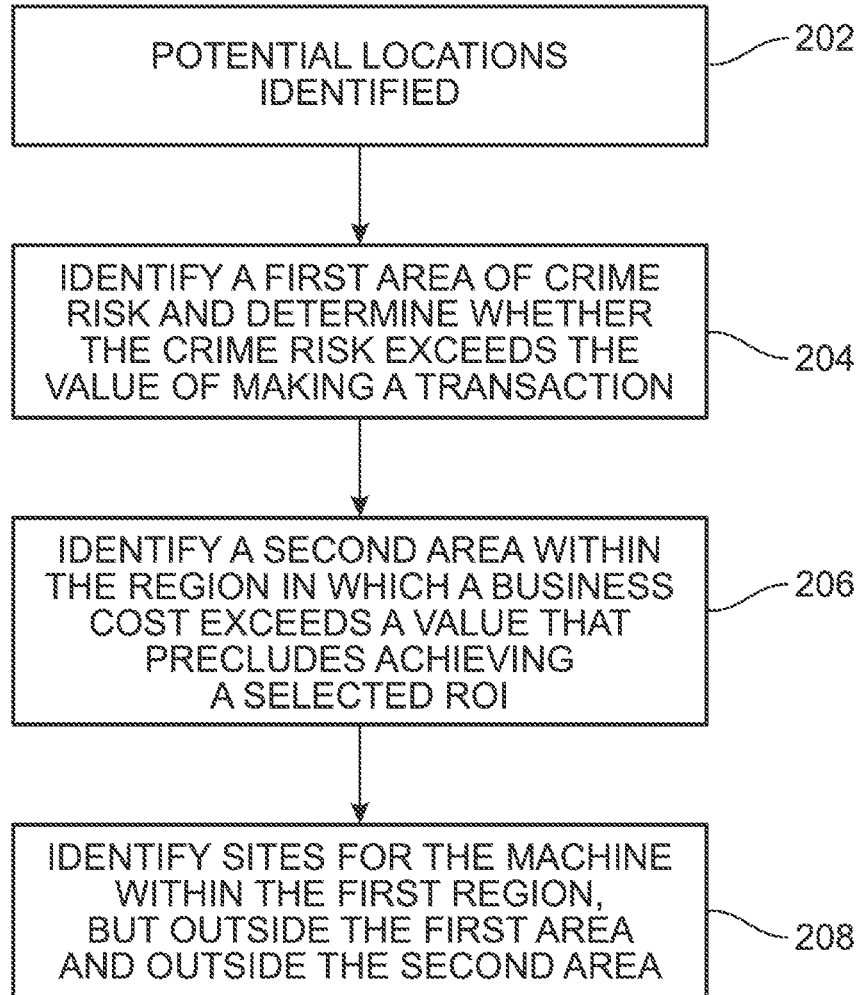

POTENTIAL LOCATIONS
IDENTIFIED ⟋202

IDENTIFY A FIRST AREA OF CRIME
RISK AND DETERMINE WHETHER
THE CRIME RISK EXCEEDS THE
VALUE OF MAKING A TRANSACTION ⟋204

IDENTIFY A SECOND AREA WITHIN
THE REGION IN WHICH A BUSINESS
COST EXCEEDS A VALUE THAT
PRECLUDES ACHIEVING
A SELECTED ROI ⟋206

IDENTIFY SITES FOR THE MACHINE
WITHIN THE FIRST REGION,
BUT OUTSIDE THE FIRST AREA
AND OUTSIDE THE SECOND AREA ⟋208

Site #2
(Military base)

1714

ZIP 10001
4500 Residents

ZIP 10003
2500 Residents

1732

1722
Road #2

Site #1
(Gas Station)

Site #3
(Restaurant)

1730

1734

1724
Road #3

ZIP 10004
2000 Residents

1720
Road #1

1726
Road #4

Site #4
(Shopping
Center)

ZIP 10002
5000 Residents

1716

1736

1712

2000
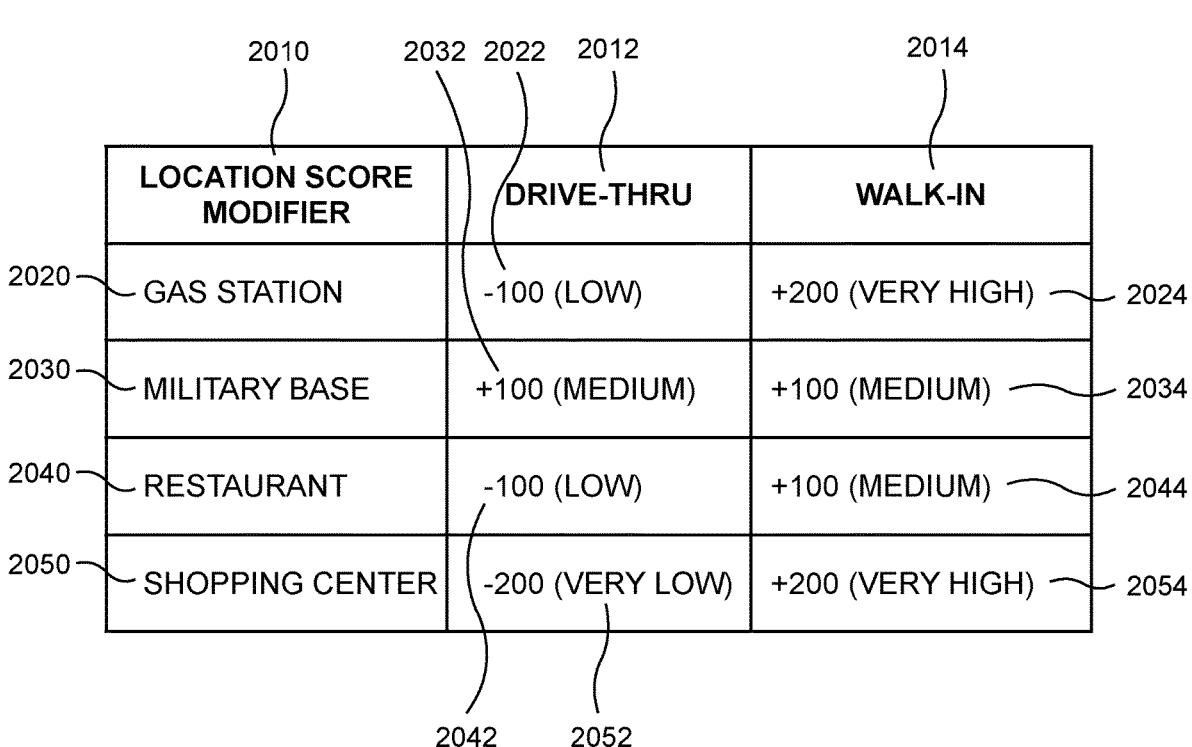
| LOCATION SCORE MODIFIER | DRIVE-THRU | WALK-IN |
|---|---|---|
| GAS STATION | -100 (LOW) | +200 (VERY HIGH) |
| MILITARY BASE | +100 (MEDIUM) | +100 (MEDIUM) |
| RESTAURANT | -100 (LOW) | +100 (MEDIUM) |
| SHOPPING CENTER | -200 (VERY LOW) | +200 (VERY HIGH) |
2010     2032  2022     2012     2014
2020     2024
2030     2034
2040     2044
2050     2054
2042     2052
FIG. 20

2100

| | 2110 | 2120 | 2130 | 2140 | 2150 |

| | CRIMES | TIME | LOCATION | OCCURENCES | SEVERITY |
|---|---|---|---|---|---|
| 2112 — | (1) MURDER | MORNING | 1 | 1 | High (1.0) |
| 2114 — | (2) THEFT | EVENING | 1 | 3 | Low (0.2) |
| 2116 — | (2) THEFT | MORNING | 2 | 2 | Medium (0.8) |
| 2118 — | (3) ROBBERY | EVENING | 2 | 2 | Medium (0.7) |

2160 — THREAT SCORE FOR　　　$(1.0 \cdot 1)$　　　+　　　$(0.2 \cdot 3) = 1.6$

2162 — LOCATION #1:　　　　　MORNING=1.0　　EVENING=0.6

2164 — LOCATION #2　　　　　　　$(0.8 \cdot 2)$　　　+　　$(0.7 \cdot 2) = 3.0$

WITH THRESHOLD OF 2.0　MORNING=1.6　　EVENING=1.4

2170 — LOCATION #1 IS OK,
　　　LOCATION #2 IS NOT

| LOCATION | INSTALLATION | | MAINTENANCE | | ROI |
|---|---|---|---|---|---|
|  | MACHINE COST | INSTALL COSTS | GOVT. FEES | OPERATION COSTS |  |
| LOC. #1 | $5000 | $3000 | $500/DAY | $500/DAY | $1800/ DAY |
| LOC. #2 | $5000 | $1000 | $1000/DAY | $1000/DAY | $2500/ DAY |
| LOC. #3 | $3000 | $3000 | $1000/DAY | $1000/DAY | $2000/ DAY |

2260 ⌐ LOC. #1 PROFITABLE AFTER 10 DAYS, $800 PROFIT/DAY

2262 ⌐ LOC. #2 PROFITABLE AFTER 12 DAYS, $500 PROFIT/DAY

2264 ⌐ LOC. #3 NEVER PROFITABLE

2270 ⌐ LOCATIONS ARE VIABLE
BASED ON THRESHOLD FOR WHEN PROFITABLE AND HOW MUCH

SITE LOCATION FOR AN INTERACTIVE MACHINE

CROSS-REFERENCE TO RELATED APPLICATIONS

This application is a Continuation-in-Part of Smith et al., U.S. patent application Ser. No. 16/457,028 filed on Jun. 28, 2019, and titled "Site Location For An Interactive Machine," which claimed the benefit of U.S. Provisional Patent Application Ser. No. 62/751,029 filed on Oct. 26, 2018 and titled "Site Location For An Interactive Machine." The disclosures of which are incorporated by reference in their entirety.

BACKGROUND OF THE INVENTION

1. Field of the Invention

The present disclosure relates to a method for selecting a location for an interactive machine. In particular, the disclosure relates to a method for selecting a location for an automated teller machine (ATM) or an interactive teller machine (ITM). Once the method selects an appropriate location for the ATM or the ITM, the method then interacts with a user to conduct the installation of the ATM or the ITM in the determined appropriate location.

2. Description of Related Art

The advent of interactive machines has provided users opportunities to receive products and services that formerly were available only with human intervention at the point of transfer. For example, the Automated Teller Machine (ATM) has provided customers with convenient access to perform banking operations both at a financial institution and remotely from a financial institution. Such machines typically may provide the user with information, such as an account balance, and may take cash or check deposits and provide cash withdrawals. Some ATMs may also provide other transactions, such as providing postage stamps, cashier checks, proof of insurance, hunting/fishing licenses and the like. An ITM is similar to an ATM, but has the ability to be connected to a human teller located in a central location. The human teller may be connected to a plurality of ITMs in a plurality of locations. ATMs and ITMs are convenient, but selecting a site location can be difficult.

There is a need in the art for a system and method that addresses the shortcomings of the prior art discussed above.

SUMMARY OF THE DISCLOSURE

In one aspect, the disclosure provides a method for selecting a location for an interactive machine. In an aspect, the method includes establishing a minimum number of transactions at the interactive machine. A first region having a number of potential users of the interactive machine present in the first region is identified. The number of potential users of the interactive machine in the first region is sufficient to at least meet an expected minimum number of transactions. The method also includes identifying movements of the potential users of the interactive machine present in the first region to identify a potential location for the machine in the first region.

In another aspect, the disclosure provides a method for selecting a location for an interactive machine, the method including establishing a minimum number of transactions at the interactive machine. A first region having a number of potential users of the interactive machine present in the first region is identified. The number of potential users of the interactive machine is sufficient to at least meet an expected minimum number of transactions. The method further includes identifying a first area within the first region in which a risk of a crime event is greater than the value of a transaction at the interactive machine. A minimum return on investment is established, and a second area is identified within the first region wherein a business cost exceeds a value that precludes achieving the minimum return on investment. This aspect of the method includes selecting a site for the interactive machine at a location within the first region but outside of the first area and outside of the second area.

In another aspect, the disclosure provides a method for selecting a location for an interactive machine. The method includes establishing a minimum number of transactions at the interactive machine and identifying a first region having a number of potential users of the machine present in the first region, each potential user having a mobile device, with the number of potential users of the interactive machine sufficient to at least meet an expected minimum number of transactions. In accordance with this aspect, the method includes identifying movement of the potential users of the interactive machine present in the first region to identify a potential location for the interactive machine in the first region.

In this aspect, the steps of identifying the movement of the potential users include operating a computer system having a processor operable to execute a set of instructions and a memory having stored thereon the set of instructions. Execution by the process of the set of instructions causes the computer system to perform a method including determining movement of the potential users present in a region by determining the locations of the potential users' mobile devices. The method also includes identifying locations of the potential users as a function of time.

This aspect also includes identifying a first area within the first region in which a risk of a crime event is greater than the value of a transaction at the interactive machine and establishing a minimum return on investment. A second area within the first region wherein a business cost exceeds a value that precludes achieving the minimum return on investment is identified. A site for the interactive machine is selected at a location within the first region but outside of the first area and outside of the second area.

Various aspects include various technological features to improve the underlying technical processes used to determine how to determine a suitable location for situating an interactive machine. Aspects also include approaches for determining which type of interactive machine is to be situated, as well as particular techniques for situating the interactive machine. For example, aspects may determine whether it is appropriate to install a drive-thru machine or a walk-in machine. When an actual installation occurs, aspects may provide assistance in the installation, such as by providing instructions to a user who carries out the installation or by otherwise guiding an automated installation of an appropriate type of interactive machine with appropriate features at an appropriate location, including geographically relevant display features like branding options, references to nearby attractions, language options (French in Louisiana, Spanish in US border states, etc.).

Aspects may also separately gather information from pedestrians and vehicles in a system. Some information may apply to both pedestrians and vehicles, such as GPS information. Some information may be specific to pedestrians, such as financial transactions, wealth profiles, and social profile, while other information may be specific to vehicles, such as information about characteristics of the vehicles. Such information may be aggregated and associated with an electronic map, which may facilitate consideration of the data. The electronic map facilitates conversion of the information to yield synthetically transformed guidance to optimize placement of the interactive machine. It organizes information about consumers in regions, information about traffic on roads, and buildings located in regions that may affect the desirability of locations. The roads may be associated with amounts of traffic, including information about times of day and pedestrian versus driver traffic.

In an aspect, the aggregated data is processed using specific techniques to yield a score indicating the suitability of a site to assess whether an interactive machine is to be installed at that location. The electronic map may aid in the scoring. The scoring may help establish if a location is sufficiently suitable, such as by comparing the score to a threshold, or ranking locations based on scoring. The scoring may be based on expected traffic, and adjusted by other characteristics of regions and users in that region, as well as the presence of devices provided by competitors. Aspects may also use particular techniques to process information related to criminal activity and profitability to assess desirability of a location.

Furthermore, aspects continue to monitor the suitability of locations as circumstances change. For example, aspects may gather updated information, update the electronic map, update the scores accordingly, and update placement and operation of the interactive machines accordingly. Hence, aspects use particular technologies to transform information in a way that addresses a technical problem, such as storing more or less cash, and provide a practical application of techniques that establish how to situate an interactive machine, or uninstall/remove a machine.

Other systems, methods, features, and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 2 is a schematic process of additional features of a process of siting an interactive machine; in accordance with an embodiment

FIG. 20 is an example diagram of a table that shows how a given building may affect the score for an area, based on whether the area is a candidate for a drive-thru ATM or a walk-in ATM, in accordance with an embodiment;

FIG. 21 is an example diagram of a table and a formula that shows details of a way in which embodiments may account for levels of crime, in accordance with an embodiment;

DETAILED DESCRIPTION

Figure 1:
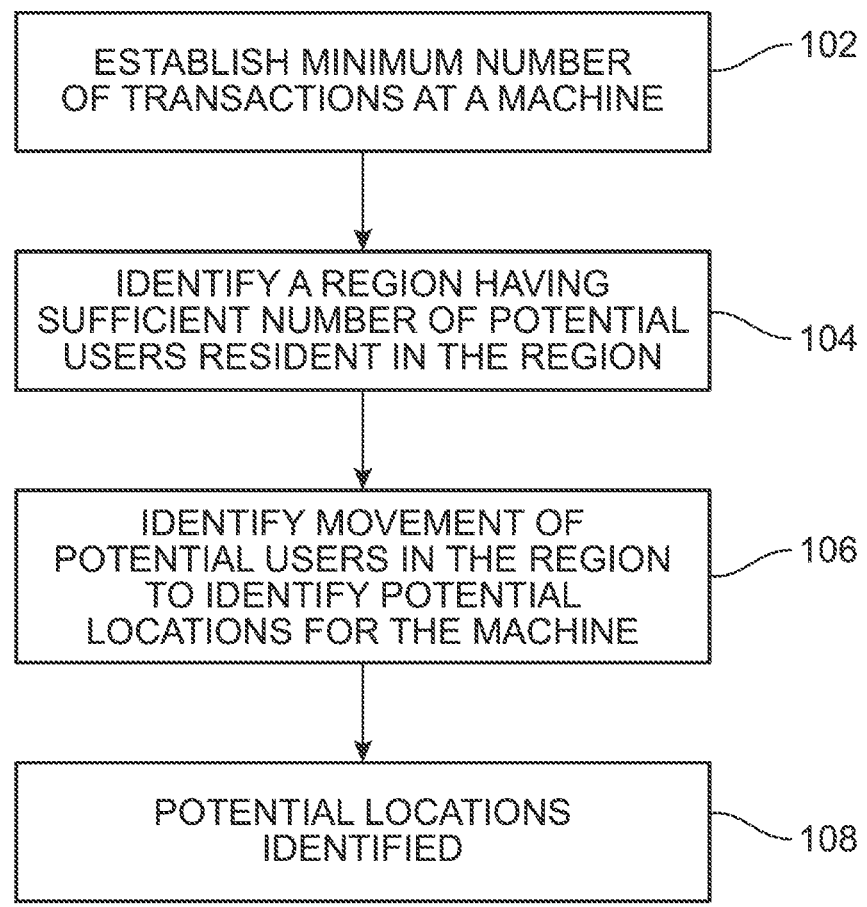
FIG. 1 is a schematic process of siting an interactive machine, in accordance with an embodiment.

Location of interactive machines has become an important part of providing conveniences and services to customers of various businesses. Such machines often can be placed in locations that require less space than a 'brick-and-mortar' location and can be operated at significantly lower cost than the larger location.

Embodiments provide a method for selecting a location for an interactive machine. The method includes establishing a minimum number of transactions at the interactive machine. A first region having a number of potential users of the interactive machine present in the first region is identified. The number of potential users of the interactive machine in the first region is sufficient to at least meet an expected minimum number of transactions. The method also includes identifying movements of the potential users of the interactive machine present in the first region to identify a potential location for the machine in the first region. While the disclosure merely refers to potential locations for convenience of expression, it is generally assumed throughout the disclosure that the locations under consideration are available locations for the machine.

In another aspect, the disclosure provides a method for selecting a location for an interactive machine, the method including establishing a minimum number of transactions at the interactive machine. A first region having a number of potential users of the interactive machine present in the first region is identified. The number of potential users of the interactive machine is sufficient to at least meet an expected minimum number of transactions. The method further includes identifying a first area within the first region in which a risk of a crime event is greater than the value of a transaction at the interactive machine. A minimum return on investment is established, and a second area is identified within the first region wherein a business cost exceeds a value that precludes achieving the minimum return on investment. This aspect of the method includes selecting a site for the interactive machine at a location within the first region but outside of the first area and outside of the second area.

In another aspect, the disclosure provides a method for selecting a location for an interactive machine including a computer system. The method includes establishing a minimum number of transactions at the interactive machine and identifying a first region having a number of potential users of the machine present in the first region, each potential user having a mobile device, with the number of potential users of the interactive machine sufficient to at least meet an expected minimum number of transactions.

In accordance with this aspect, the method includes identifying movement of the potential users of the interactive machine present in the first region to identify a potential location for the interactive machine in the first region.

In this aspect, the steps of identifying the movement of the potential users include operating a computer system having a processor operable to execute a set of instructions and a memory having stored thereon the set of instructions. Execution by the process of the set of instructions causes the computer system to perform a method including determining movement of the potential users present in a region by determining the locations of the potential users' mobile devices. The method also includes identifying locations of the potential users as a function of time.

This aspect also includes identifying a first area within the first region in which a risk of a crime event is greater than the value of a transaction at the interactive machine and establishing a minimum return on investment. A second area within the first region wherein a business cost exceeds a value that precludes achieving the minimum return on investment is identified. A site for the interactive machine is selected at a location within the first region but outside of the first area and outside of the second area.

Interactive machines already mentioned, ATMs and ITMs, are popular in the financial services industry, particularly banks, savings and loans, and credit unions. An interactive machine that sells life insurance for travelers logically would be located in bus terminals, airports, train stations, and other places travelers would be found. Interactive machines for weighing a package, calculating the postage based on the speed of delivery and other services requested, and then applying postage to packages, may be found in post offices and elsewhere. Any of these machines may be placed anywhere the owner selects.

Although locations of sites for interactive machines of various types may be identified in accordance with the disclosure, the disclosure will be particularly directed to ATMs and ITMs placed by financial institutions. Such interactive machines typically are equipped to carry our basic transactions that the general public seeks in such machines, such as accepting deposits of cash and checks, reporting account balances, and disbursing cash or checks upon demand.

Interactive machines also may perform other transactions important to a group of individuals who may form an affinity group. Such affinity groups comprise members who have an interest in activities related to a sport, business relationship other than the relationship with the financial institution owning the interactive machine, or status as a member of a group, a club, or the military, for example.

Members of an affinity group may have special needs relating to financial institutions. For example, members of a military-based affinity group may prefer to access benefits, such as cash payments, from a governmental source, such as the Veteran's Administration (VA), through their financial institution. Thus, such a member may seek to obtain VA benefits through an interactive machine. Although this disclosure is particularly directed to interactive machines placed by financial institutions, additional aspects of the disclosure will be directed to a financial institution having military-related members as an affinity group.

Interactive machines may be located in many places. In accordance with embodiments, potential locations may be evaluated to ensure simultaneous usefulness to potential users while being financially acceptable to the financial institution. Potential locations may also be evaluated to ensure that an appropriate type of machine is to be installed. For example, as discussed in greater detail later, potential locations may be considered with respect to a determination of whether a given location is more suitable as a walk-in or a drive-thru location. Such a determination may be made by tracking the motions of potential users along with information about whether these tracked users are pedestrians or drivers or passengers of motor vehicles.

FIG. 1 is a schematic illustration of a method of an embodiment of the disclosure. Early in the process at step

100, the financial institution establishes a minimum number of transactions to be made at the interactive machine. These transactions may be of any type, and the financial institution may require a minimum number of each type of transaction to be available at the interactive machine. These transactions provide a minimum level of activity at the interactive machine.

As illustrated at step 102 in FIG. 1, regions having sufficient density of potential users are established. Boundaries of a region may comport to boundaries of a zip code, of an election precinct, of a neighborhood or community of neighborhoods, of a city, town, township, county, or other governmental region, or any type of geographical region in which a sufficient number of potential users are located. A region also may have one or more sub-regions, which may be areas of special interest within a region that will have sufficient use of interactive machines to satisfy the minimum number of transactions. Such a sub-region may have a sufficient number of potential users during evening times during which entertainment venues, including restaurants, movie theaters, and the like, are present.

In accord with embodiments, as illustrated at step 104, movement of potential users in the region is identified and used to identify potential locations for installation of an interactive machine. Movement of potential users may be determined or identified by computer monitoring of a portable device that can report the owner's position, or may be obtained from sources that track movement. For example, such monitoring of the portable device may include receiving information about the location of the portable device as it changes over time based on geolocation hardware such as Global Positioning System (GPS) hardware or Bluetooth, Wi-Fi, or cellular network based geolocation. Movement may be recorded by operating a computer system having a processor operable to execute a set of instructions and a memory having stored thereon the set of instructions. Execution by the process of the set of instructions causes the computer system to perform a method comprising determining movement of the potential users present in the region by determining the locations of the potential users' mobile devices. Other determinants, such as transaction histories of potential users, also may be used to identify potential sites for locating interactive machines, as shown as step 106. As shown at step 108 in FIG. 1, then potential locations are identified. However, the potential locations identified at step 108 are only potential locations with respect to the determinations made in FIG. 1 with respect to user movements and density and how these change over time.

As shown in FIG. 2, step 202 is the starting point for eliminating from consideration potential locations that may be fiscally acceptable, but which may be considered unsuitable for other reasons. For example, as shown at step 204, embodiments may include identifying a first area of crime risk and determining whether the crime risk exceeds the value of making a transaction. Crime risk may include all types of crimes, such as crimes against the person and property crimes, such as vandalism. Also, the time of day such crimes are committed may be taken into consideration. Typically, the characteristics of the crime are analyzed to determine a crime risk to a potential user of an interactive machine installed in a crime area. Typically, sites for interactive machines are excluded from areas of high crime.

As illustrated at step 206, embodiments may include identifying a second area within the first region wherein a business cost exceeds a value that precludes achieving the minimum return on investment. This step contemplates determining and assigning to the location all costs of locating an interactive machine at the proposed site. The second area may be a contiguous area within the first region, or may be a number of separate areas within the first region. Typically, interactive machines are not located within such a second area because selections of such locations are not fiscally responsible.

As the skilled practitioner recognizes, steps 206 and 208 can be interchanged in the order of determination, as can other steps that involve determinations or identifications that are used in more than one step.

Thus, as illustrated at step 208, suitable sites for locating an interactive machine are within the first region, but outside the first area and outside the second area.

Additional details for each of these steps as relating to a financial institution whose members include an affinity group for the military services are set forth herein. However, the disclosure is considered to encompass any entity seeking to establish a location for any suitable interactive machine.

Determination of potential user density in a region may include as few or as many individual considerations as a financial institution considers appropriate to make the determination with a selected degree of certainty that the calculation or determination is adequate. The embodiments described herein are indicative of factors that may be or typically are considered in the method.

Within a region, the potential users' financial habits or practices may form a significant portion of the determination of potential sites or locations for interactive machines. Typically, a potential user's home address and business address help define a region. Similarly, a potential user's spending habits provide a wealth of information about a potential user's locations at various times of the day. For example, regular visits to a restaurant during the midday identify a favorite lunch spot. Such financial transactions are carried out on mobile devices, such as credit or debit card use, or payment through mobile phone applications, all of which can be located by a computer, as set forth above. Embodiments may gather information about such financial transactions and store them in a data repository for additional analysis. Such a data repository may include information about a large number of financial transactions. Each financial transaction may be associated with related metadata, such as an identity of the user, a payment means used to carry out the transaction, a location of the financial transaction, timing information for the transaction, and so on.

In an embodiment, other financial information related to the potential user may be obtained from other sources and used to build a wealth profile for the potential user. For example, the potential user's salary information—past, present, and likely future—is an important part of a wealth profile. Similarly, the make and model of the potential user's vehicle or vehicles may be obtained from public records. The potential user's social profile, such as visits to restaurants, movies, plays, gasoline stations, and other commercial entertainments may be identified. These records of spending over time may be gathered and entered into a computer, which then may produce a trend for the wealth file. In particular, the computer may be used to monitor the usage of the vehicles and use the computer to monitor and locate the vehicle, often by using a GPS system or another type of geolocation system already installed in the car. Information relating to every-day activities, such as shopping for groceries, transporting children to schools, obtaining service for vehicle(s) owned by the potential user, all may be used to create a mapping profile or a location profile for the potential user.

In an embodiment relating to financial institutions having an affinity group relating to the military, knowledge of military plans also is useful in decisions relating to where to site interactive machines. Plans for site closures; opening of new sites; troop relocations, including temporary assignments for training; cyclic operation, such as at the military academies; site consolidations; and reductions in force, all are relevant to locations of sites for interactive machines. Such plans may provide information that may be taken into account when determining if a site is to be considered a desirable location or not.

Embodiments relating to military affinity groups also must consider potential users' transactions at post exchanges, base exchanges, and Army and Air Force exchanges. In some of these locations, bank services may be available through bank offices and bank interactive machines. Similarly, transactions at locations that may tend to attract members of the military, such as barber shops, gun clubs, shooting ranges, and the like. For each of these criteria, trends can be calculated based on past data and on information relating to future activities to identify activities in a region.

Figure 3:
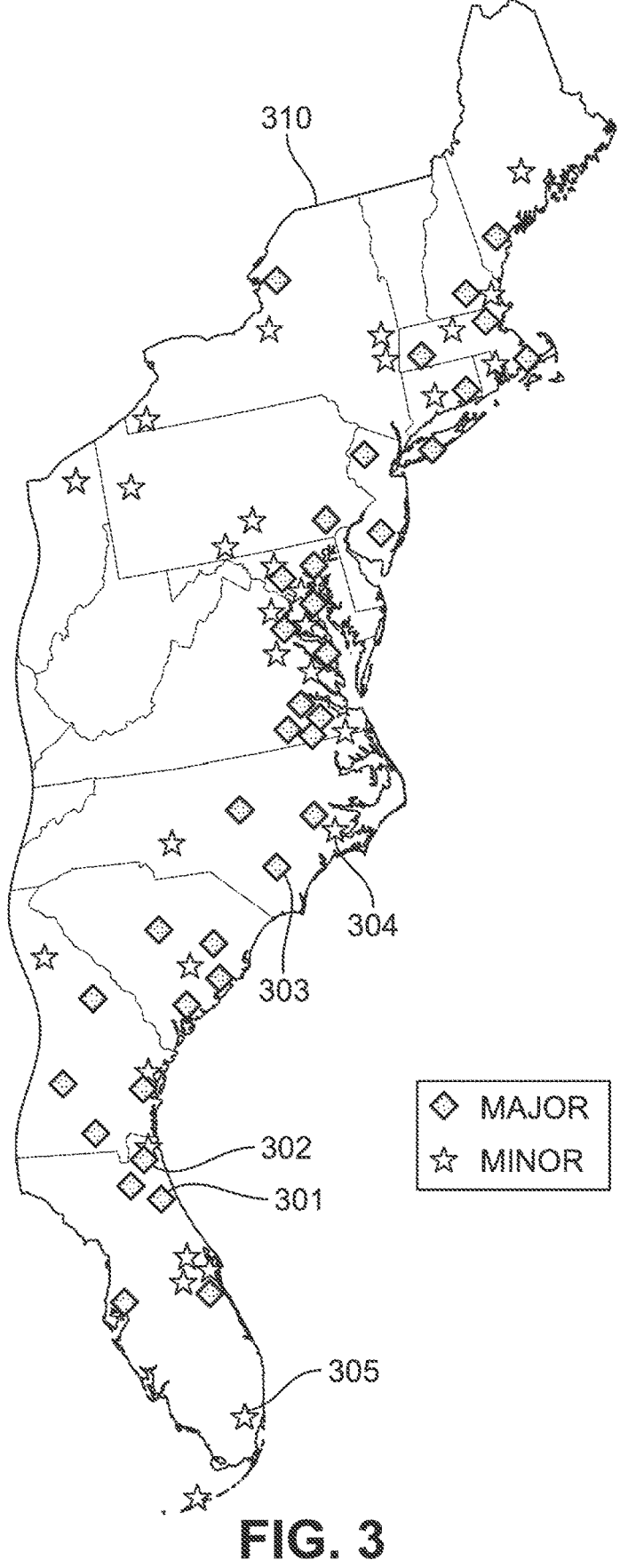
FIG. 3 is a schematic view of the location of military bases on the east coast of the United States, in accordance with an embodiment.

FIG. 3 is a schematic presentation relating to locations of military bases on the eastern seaboard 310. Representative locations of first major base 301, second major base 302, and third major base 303, together with first minor base 304 and second minor base 305, are illustrated. Major bases and minor bases may be distinguished by the number of personnel working there.

Figure 4:
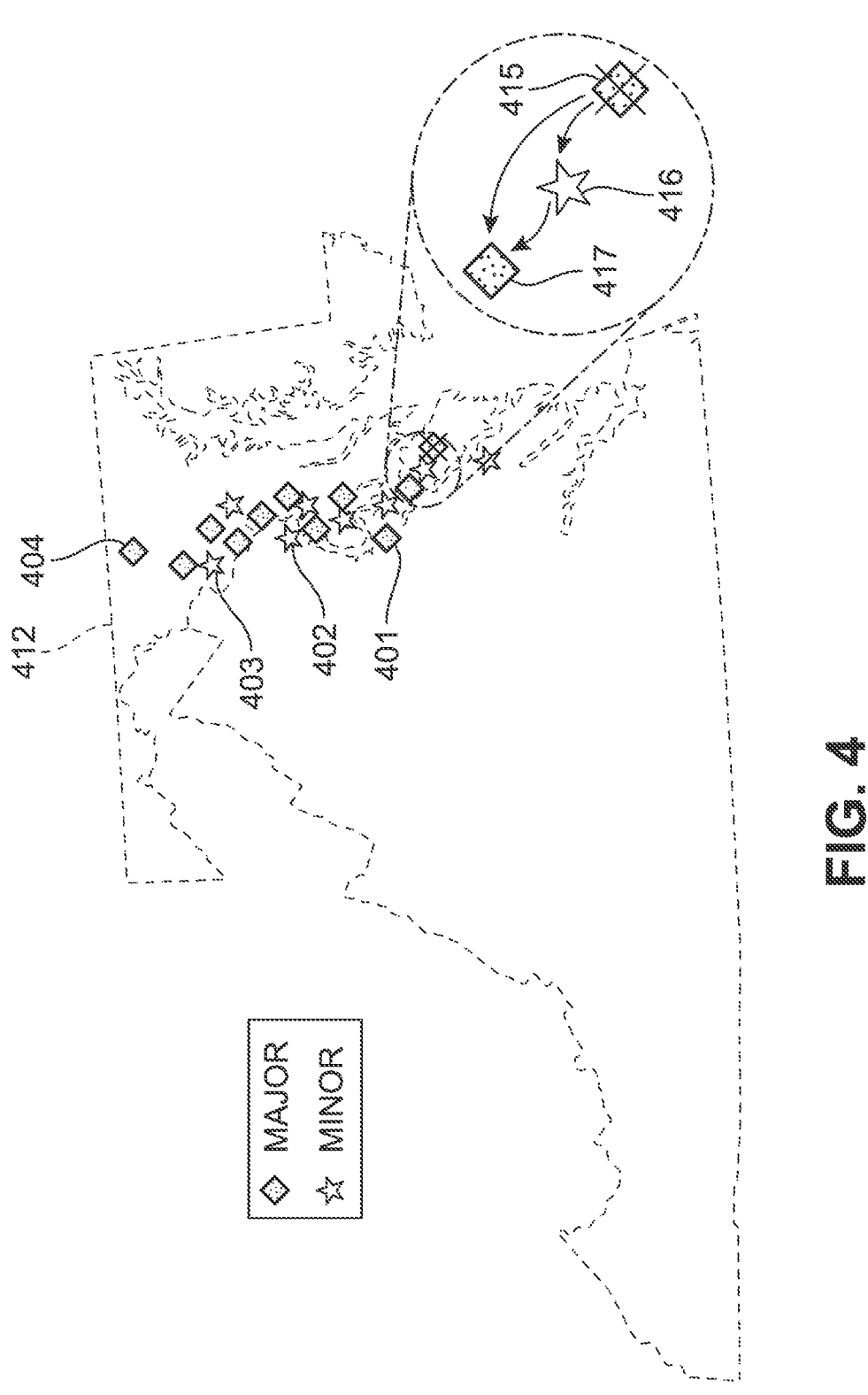
FIG. 4 is a schematic view of the location of military bases in a region of the east coast of the United States, in accordance with an embodiment.

FIG. 4 illustrates representative locations of first major base 401 and second major base 404, together with first minor base 402, second minor base 403, and third minor base 416 in the portions 412 of Maryland and Virginia adjacent to the District of Columbia. The enlarged view illustrates closing of third major base 415 and the expansion of third minor base 416 to become fourth major base 417. Thus, when evaluating these locations, and locations around them, one must consider this closing and shift assets to fourth major base 417, if such a transfer is warranted by demand and the other factors under consideration. When a base closes, embodiments could be to remove/deactivate/close an ATM or an ITM at that site because there may no longer be sufficient demand for an ATM or an ITM at that site. However, it may be beneficial to keep the ATM open if transaction volumes are high and the site remains available for access or move to an adjacent location. By contrast, when a base opens, embodiments may open an ATM or an ITM at that site.

FIG. 3 and FIG. 4 illustrate representative locations of military installations, but do not illustrate any other kind of business or institution. It is impractical to illustrate every feature at such a scale. However, the description above relating to determination of potential user density in a region, in combination with the drawing figures, discloses how to determine potential user density in a region or, expressed alternatively, how to identify a first region having a number potential users of the interactive machine present in the first region and that the number of potential users of the interactive machine is sufficient to at least meet an expected minimum number of transactions.

Movements of potential users in the region may in part be obtained from selected information collected and analyzed in relationship with establishing the region having sufficient users to make the interactive machine profitable, or with the determination of potential user density in a region. In particular, those features that lead to or result in a profile, trend, or relationship, such as tracking, timing, and frequency to form a location profile, may suitably also be used to establish a potential user's movements. Additionally, to track user movements, it may be helpful for embodiments to construct electronic maps that represent information about various areas under consideration as sites for ATMs and ITMs. For example, the electronic maps may correspond to reports or analyses derived from data in a Geographic Information System (GIS).

Figure 5A:
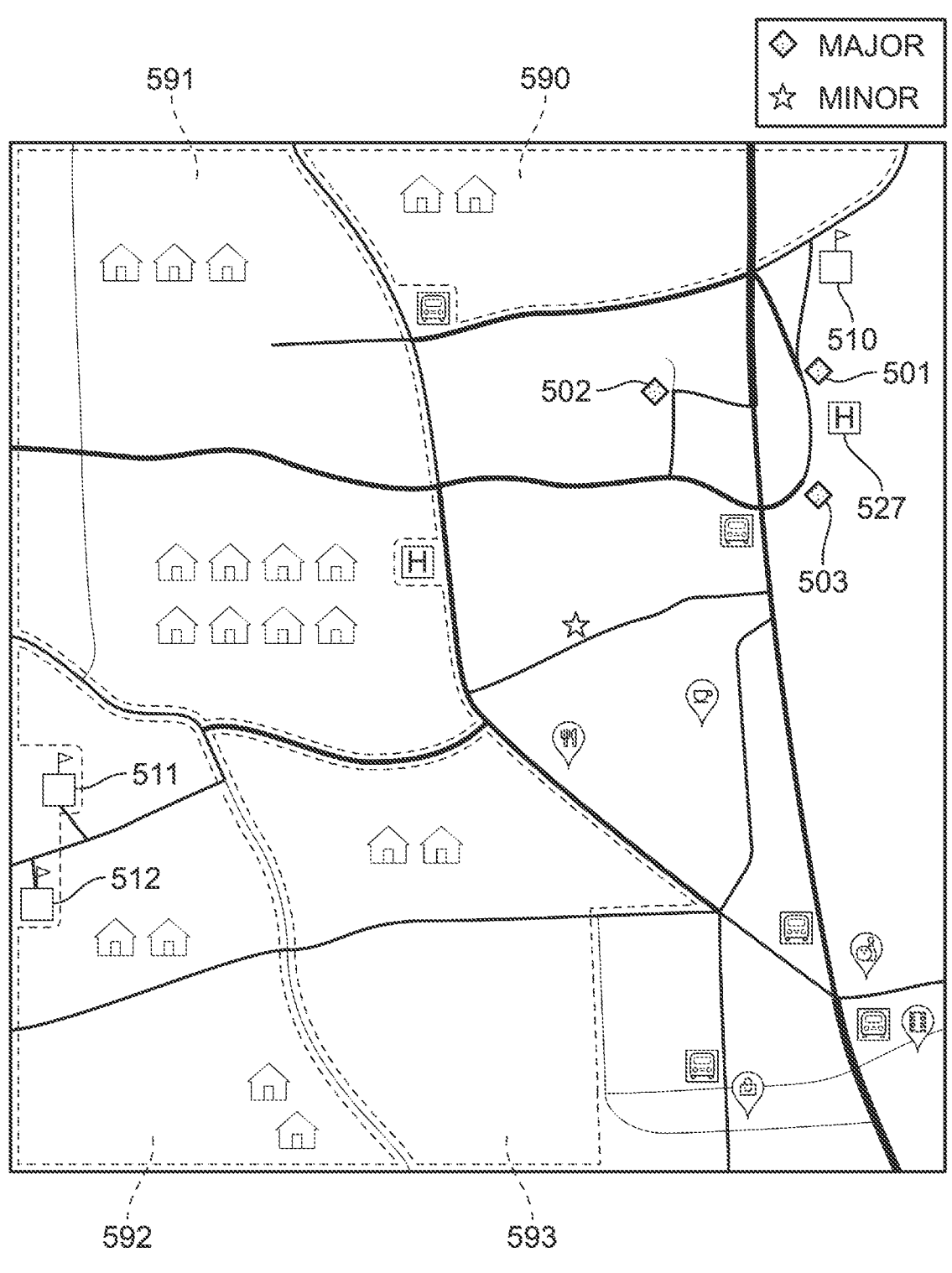
FIG. 5A is a schematic view of representative movement of potential users resident in an area of a selected region at a first time of day, in accordance with an embodiment.

FIG. 5A illustrates a schematic representation of potential locations for potential users in a representative first region that includes first residential area 590, second residential area 591, third residential area 592, and fourth residential area 593. First school 511 and second school 512 are located near residential areas, whereas third school 510 is located near first major base 501, military hospital 527, and second major base 503. FIG. 5A may be represented by embodiments using an electronic map that facilitates analysis of the information presented within FIG. 5A.

Figure 5B:
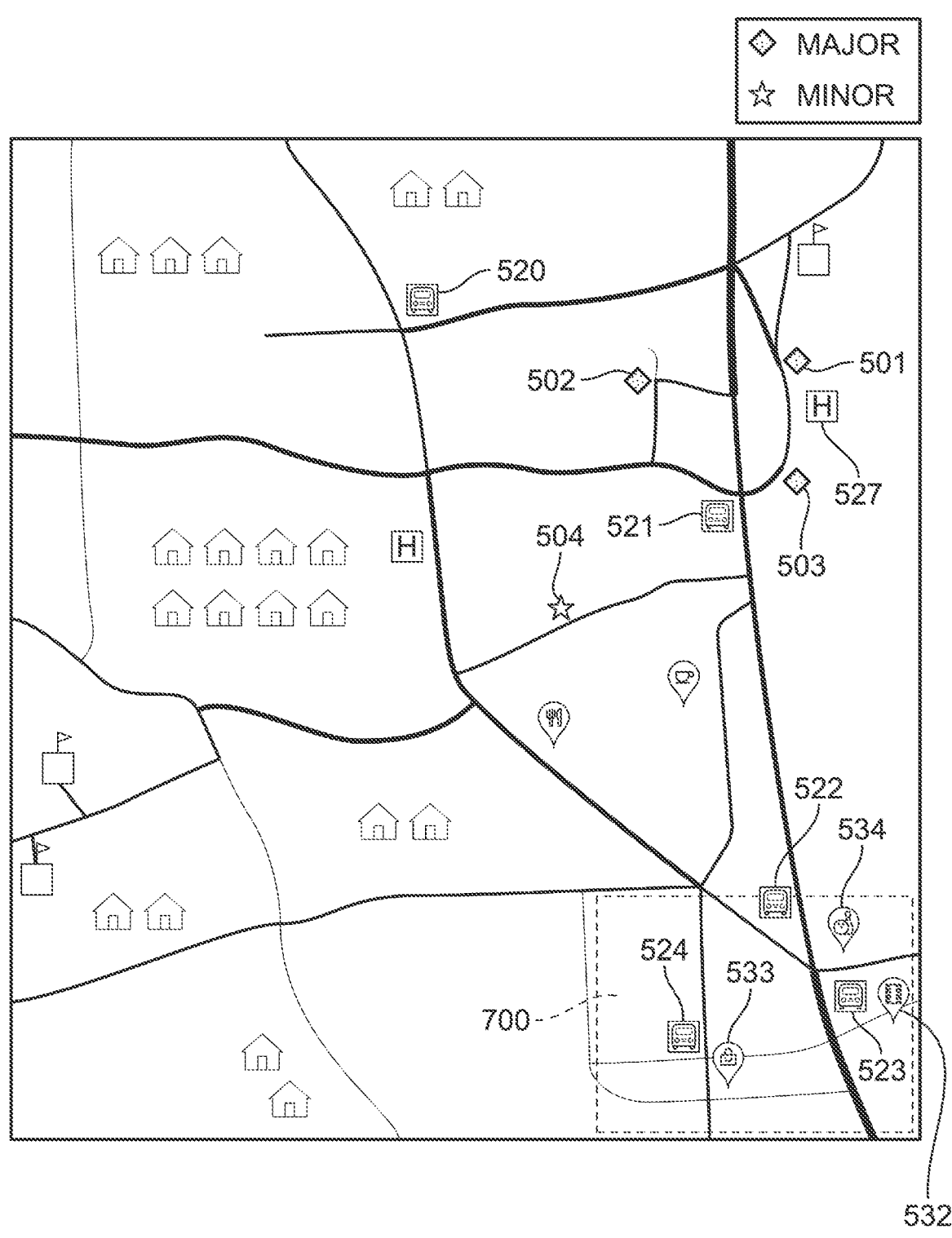
FIG. 5B is a schematic view of representative movement of potential users resident in another area of a selected region at a first time of day, in accordance with an embodiment.

As illustrated in FIG. 5B, third major base 502 is across a road from first major base 501, military hospital 527, and second major base 503, with minor base 504 is further away. Public transportation stops are indicated at first transportation 520 (near a residential area), second transportation 521 (near the bases), and third transportation 522, fourth transportation 523, and fifth transportation 524 (located in business and entertainment center 700, including movie theater 532, shopping area 533, and bowling center 534). FIG. 5B may be represented by embodiments using an electronic map that facilitates analysis of the information presented within FIG. 5B.

Figure 5C:
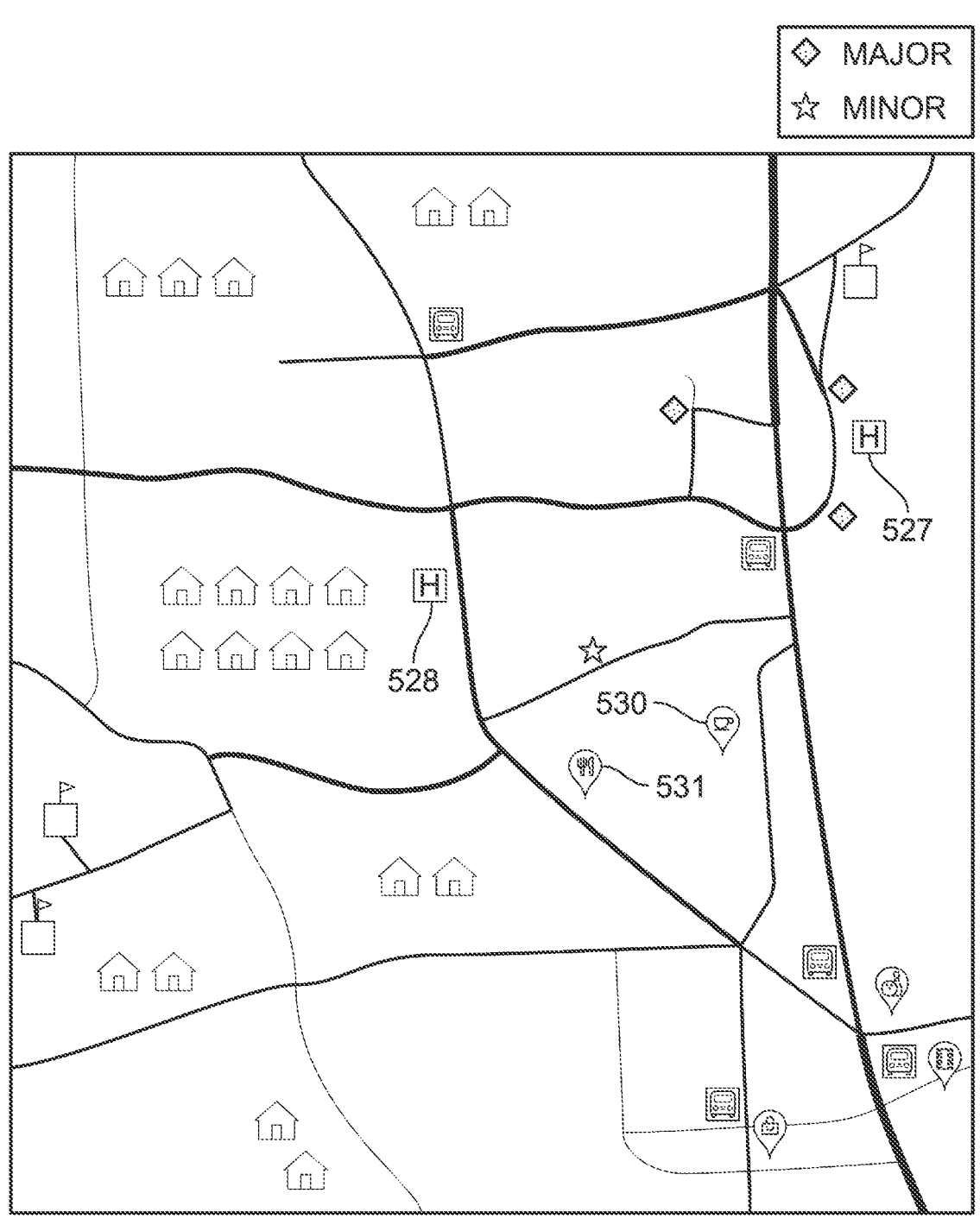
FIG. 5C is a schematic view of representative movement of potential users resident in yet another area of a selected region at a first time of day, in accordance with an embodiment.

Representative coffee shop 530 and restaurant 531 are illustrated in FIG. 5C. Military hospital 527 and second hospital 528 also may have restaurants of some sort, which potential users of interactive machines in the region may use. However, the use of a payment system, including cash, at a hospital relates to a single location, even though not only food in a restaurant, but also flowers and other gifts from hospital shops, may be purchased. FIG. 5C may be represented by embodiments using an electronic map that facilitates analysis of the information presented within FIG. 5C.

Thus, FIG. 5A, FIG. 5B, and FIG. 5C may be examples of electronic maps of a geographic area that may include information about the geographic area used to determine In FIG. 5A, FIG. 5B, and FIG. 5C, roads are illustrated as major and minor passageways, whether vehicular or pedestrian, throughout the illustrated region. However, the electronic maps as shown in FIG. 5A, FIG. 5B, and FIG. 5C may also store information about traffic flows separated into vehicular and pedestrian constituent elements. As discussed below, it may be helpful for embodiments to decide whether an interactive machine to be situated is to be a drive-thru machine or a walk-in machine. However, in a morning commute, traffic flows generally from the residential areas toward schools and places of employment, and roads become more crowded than the passageways can handle. In particular, traffic flow is heavy around the military bases, as would be expected of potential users of interactive machines. By contrast, in an evening commute, traffic flows generally from the schools and places of employment to residential areas. Hence, when analyzing patterns of user movement, it may be helpful to aggregate movement into groups including morning commute movement during a set time range (such as 6 AM to 11 AM) and evening commute movement during a set time (such as 4 PM to 9 PM).

In embodiments, the flow of potential users of interactive machines to be sited in accordance with the disclosure is determined in accordance with an embodiment of a method described in relationship to FIG. 1. The number of potential users of an interactive machine influences the siting of the interactive machine. Thus, the number of potential users, and their density throughout the day, is determined in accordance with an embodiment of the disclosure. For example, the location of users/consumers may be stored in accordance with an electronic map at set intervals. For example, embodiments may assess user locations and store the locations in association with an electronic map at 10 minute intervals, 15 minute intervals, 20 minute intervals, 30 minute intervals, or 60 minute intervals. Such locations may show where users are as time passes during the day.

Figure 6:
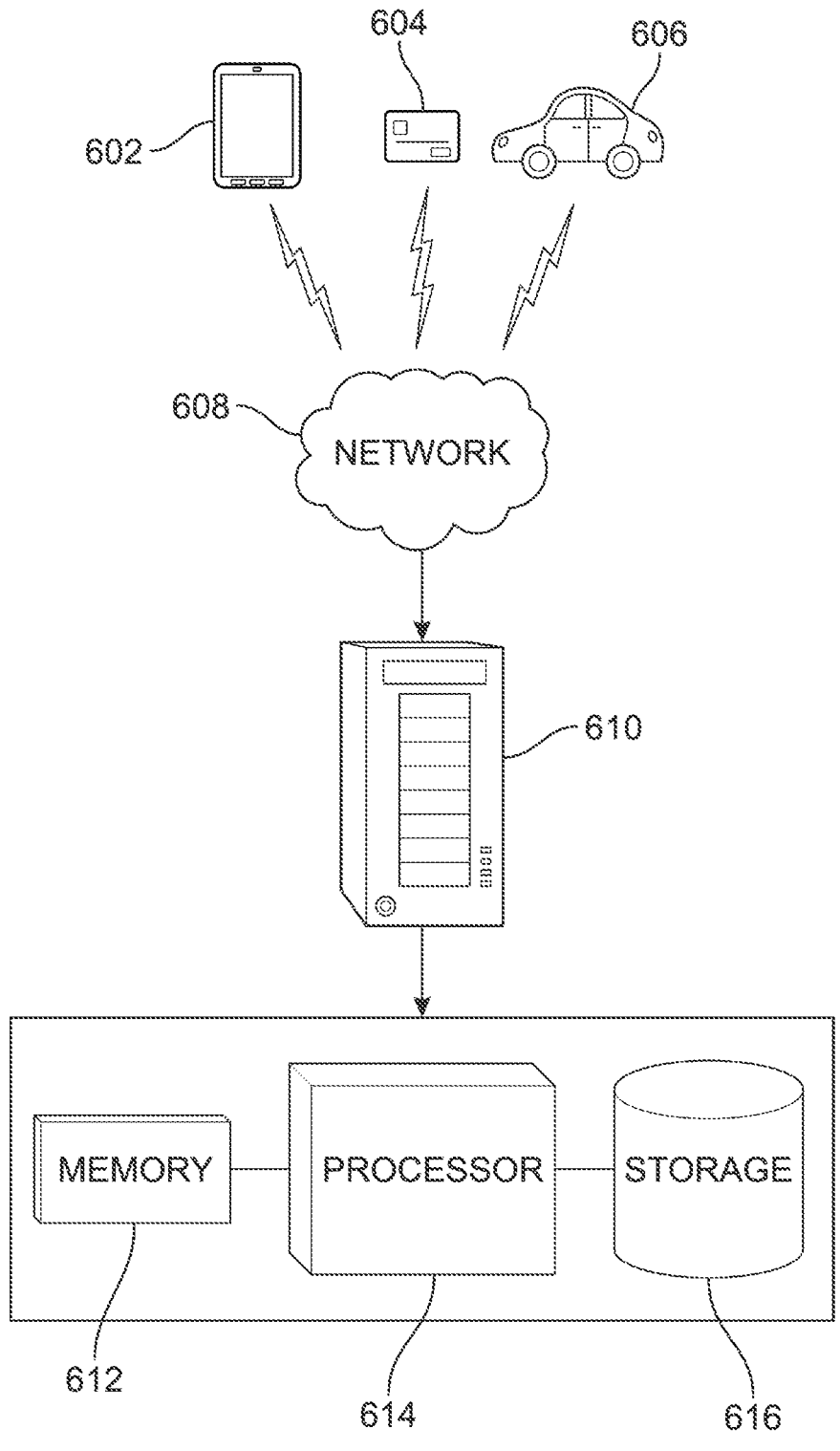
FIG. 6 is a schematic process of an embodiment of determining and recording the locations of potential users of interactive machines, in accordance with an embodiment.

In accord with embodiments, and as illustrated at step 104 of FIG. 1, movement of potential users in the region is identified and used to identify potential locations for installation of an interactive machine, as set forth in step 104 in FIG. 1. As illustrated in FIG. 6, movement of potential users may be determined or identified by computer monitoring of a portable device that can report the owner's position, such as mobile phone 602, credit or debit card 604, or GPS in a vehicle 606. Positions may be reported to network 608, which is connected to server 610. Movement may be recorded by operating a computer system connected to server 610 having processor 614 operable to execute a set of instructions and memory 612 having stored thereon the set of instructions. Execution by the process of the set of instructions causes the computer system to perform a method comprising determining movement of the potential users present in the region by determining the locations of the potential users' mobile devices and storing that information in storage 616. As noted, such locations may be stored in association with electronic maps of the geographic regions to facilitate consideration of which areas have high densities of potential users and which areas have low densities of potential users, as well as times at which these density levels occur. Other determinants, such as transaction histories of potential users, estimates of cash deposits, cash withdrawals, complexity of typical transactions, a preponderance of significant consumer preference (for example, older consumers that prefer human interaction and young consumers who want guidance might lead to installation of an ITM instead of an ATM) also may be used to identify potential sites for locating interactive machines, as shown as step 106.

Figure 5D:
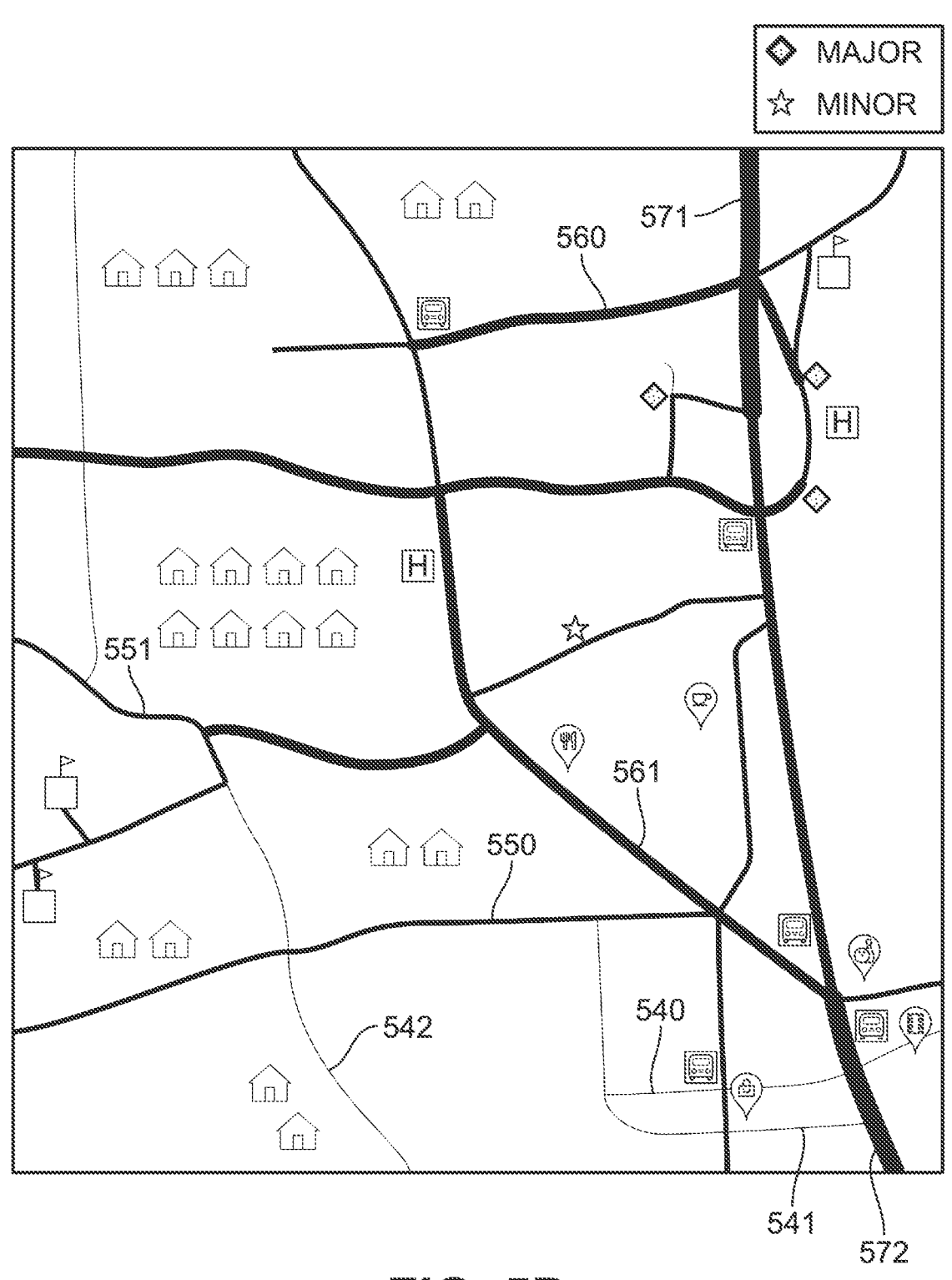
FIG. 5D is a schematic view of representative movement of potential users resident in a selected region at a first time of day, evaluated by determining and recoding the locations of potential users, in accordance with an embodiment.

In FIG. 5D, the relative flow rates of potential users along the road and street system for a morning commute are illustrated in FIG. 5D by the relative widths of the lines. FIG. 5D shows an electronic map including user movement information for the morning commute. Thus, first road segment 540 and second road segment 541, both of which are in entertainment district 700, illustrate little to no traffic. Similarly, third road segment 542, in a residential area, shows low traffic flow. As can be seen, these roads typically are in residential areas or in shopping areas, which get little or no business during the morning commute. Thus, each road segment presented in FIG. 5D is stored in the electronic map in association with a thickness, where the thickness corresponds to the little or no business associated with these road segments.

As further illustrated schematically on FIG. 5D, some roads have light traffic. Such roads include fourth road segment 550 and fifth road segment 551. These roads typically carry potential users from home neighborhoods to public transportation. These roads also serve as feeders to the busier roads. Each of these road segments is also stored in the electronic map in association with a thickness, where the thickness (for example, lower record frequency) corresponds to the light traffic associated with these road segments.

Busy roads typically serve to collect traffic and funnel it to the busiest roads, such as sixth road segment 560 and seventh road segment 561 in FIG. 5D. These busy roads also serve to deliver traffic to roads in the largest areas of employment, shopping, etc. These delivery roads include eighth road segment 565 and ninth road segment 567. Each of these road segments is also stored in the electronic map in association with a thickness, where the thickness corresponds to the busy traffic (for example, higher record frequency) associated with these road segments.

The busiest roads, identified in FIG. 5D as tenth road segment 571 and eleventh road segment 572, carry the heaviest load and deliver potential users to work sites both at the top (military sites) and flowing away from the region at the bottom of FIG. 5D. Each of these road segments is also stored in the electronic map in association with a thickness, where the thickness corresponds to the busiest traffic associated with these road segments.

The flow on each road may be clearly characterized as either vehicular traffic or pedestrian traffic. For example, each electronic map may include, for each road segment, information about how much vehicular traffic is associated with the road segment at a given time and information about how much pedestrian traffic is associated with the road segment at a given time. Also, the direction of traffic must be determined. The direction of traffic may be determined by observing how the positions of individual vehicles and pedestrians change over time. Some traffic may be parents returning home after delivering children to school or schools. However, all of this information is useful in determining potential sites for interactive machines. For example, a parent may seek to receive cash from an ATM while walking home after completing school deliveries, but before driving to the store to do grocery shopping. In particular, identification of the type of interactive machine used, i.e., whether the interactive machine is accessed on foot or as a drive-thru, is useful information in a potential user map profile.

Based on considering such information, a new or different (change in features) interactive machine to be installed may be chosen to be a walk-in machine or a drive-thru machine. For example, in some embodiments, steps may be taken to determine a good location for installing an interactive machine. Once such a location is identified, some embodiments may determine whether a majority of users of such an interactive machine would be pedestrians or would be vehicular users. For example, determining such a majority may be based on a total number of projected users during a day, or may be based on a number of projected users during a particular time interval, such as projected users during a morning commute or during an evening commute.

Much of this information identified here by a computer system, such as the one described above, that may be obtained. In particular, the computer system may be used to monitor the usage of a mobile device and to use the computer to monitor and locate the mobile device.

Other information may be useful in creating a mapping profile. Such a mapping profile characterizes the movement of users for aggregation so that the movement of users may be analyzed more effectively to determine how user movement indicates an interactive machine is to be situated. The mapping profile may be stored as an electronic map. Selected transaction histories, such as toll frequencies and ride service (taxi, Lyft, Uber) usage, also provide useful information. Such transaction histories may be associated with individual users. Further, information relating to public transportation, including for example bus routes, train routes, and times of operation, may be of use in predicting the location at a given time of a user of public transportation. Such information may include information about a type of public transportation Computer systems also may be used to locate a mobile device of a public transportation rider. For example, as a user travels on public transportation such as a bus or a train, geolocation hardware may track the movement of that user, or data may be obtained from the transportation provider (ticket sales by user, for example).

Figure 7:
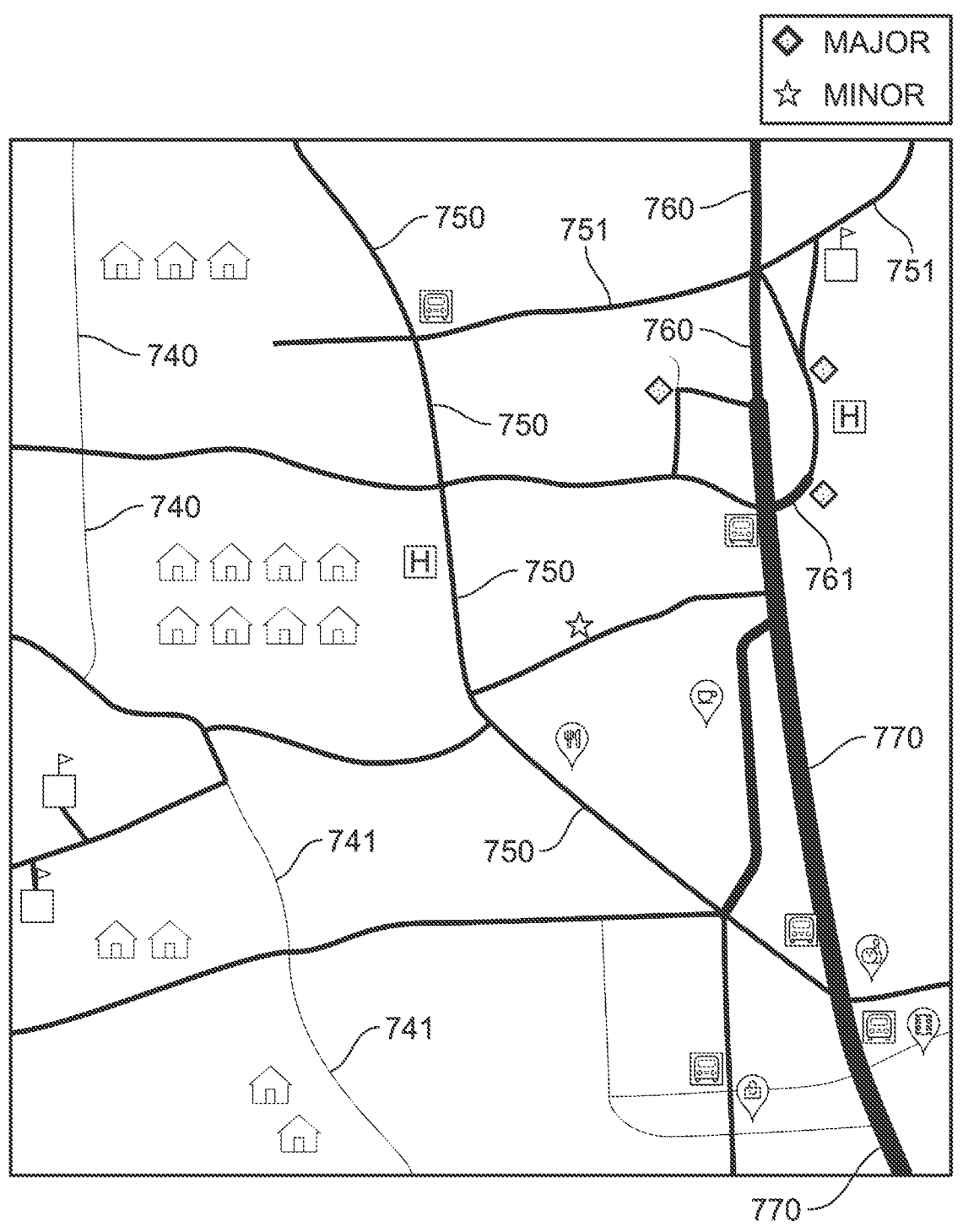
FIG. 7 is a schematic view of representative movement of potential users resident in the selected region at another time of day, in accordance with an embodiment.

A movement map such as FIG. 5D would be expected to be different at different times of the day. Such daily differences in FIG. 5D may be stored in an electronic map (. Whereas FIG. 5D depicts a morning rush hour, FIG. 7 depicts what might be a typical afternoon rush hour. The traffic pattern on FIG. 7 clearly differs from that of FIG. 5D in that more people are travelling toward the bottom of the map, rather than toward the residential areas on the left side of FIG. 7. The stationary features of FIG. 7 are the same as those of FIG. 5D. However, the road segments have been re-numbered because they now carry differing volumes of potential users than in the morning depiction. Thus, a separate electronic map corresponding to movement patterns during an afternoon rush hour may be stored as FIG. 7. The movement patterns may also be associated with separate information about movements of vehicle and movements of pedestrians.

In FIG. 7, as in FIG. 5D, the relative flow rates of potential users along the road and street system are illustrated by the relative widths of the lines. Such flow rates are modeled by an electronic map. Thus, first afternoon road segment 740 and second afternoon road segment 741, illustrate little to no traffic. As can be seen, these roads typically are in residential areas or in shopping areas, which get little or no business during the afternoon commute. Such information about first afternoon road segment 740 and second afternoon road segment 741 being associated with little to no traffic may be stored on the electronic map.

As further illustrated schematically on FIG. 7, some roads, such as third afternoon road segment 750 and fourth afternoon road segment 751, have light traffic. Such flow rates are modeled by an electronic map. These roads typically carry potential users to home neighborhoods from public transportation. These roads also serve as feeders away from the busier roads. Such information about third afternoon road segment 750 and fourth afternoon road segment 751 being associated with light traffic may be stored on the electronic map.

Busy roads typically serve to collect traffic and funnel it to the busiest roads. Such flow rates are modeled by an electronic map. These busy roads, such as fifth afternoon road segment 760 and sixth afternoon road segment 761, also serve to deliver traffic to roads from the largest areas of employment to the shopping and entertainment areas. Seventh afternoon road segment 770 serves as the busiest road during an afternoon and evening commute. Such information about fifth afternoon road segment 760 and sixth afternoon road segment 761 being associated with busy traffic, as well as seventh afternoon road segment 770 being associated with the busiest traffic, may be stored on the electronic map.

Figure 8:
FIG. 8 is a schematic view of representative movement of potential users resident in a sub-region within the selected region at still another time of day, in accordance with an embodiment.

FIG. 8 is a detailed schematic view of nighttime in an entertainment and shopping sub-region related to the region illustrated in FIG. 5D, for example. Again, the information presented in FIG. 8 may be represented and stored in some embodiments by using an electronic map. The sub-region illustrated in FIG. 8 is sufficiently busy to merit separate evaluation of sites for interactive machines.

In FIG. 8, the width of the lines within the parallel boundaries of each road segment indicates the number of potential users present, whether as vehicular traffic or pedestrian traffic, on the streets and in the stores lining the route. As noted, additional information may be included within the electronic map of FIG. 8 that includes separate information about the numbers of vehicular users and the numbers of pedestrian users. A dashed line represents few potential users, and a line filling the road illustrates a very large number of potential users. For example, first night road segment 801 serving grocery store 820 is relatively lightly used during this period. Second night road segment 806 serves restaurant 846 and bowling alley 823, but little else along this road.

It may be reasonable to site an interactive machine close to pedestrian entrances to parking lot 821 to facilitate cash withdrawals to pay for the parking or a tip to the valet, for example. Thus, when such a parking lot is situated in this manner, it may indicate that situating the site for an ATM in this manner may be helpful.

Third night road segment 805 carries traffic to a live entertainment venue 822, where cash withdrawals from an interactive machine may be expected to be larger than withdrawals at restaurants, for example. This relationship may suggest that live entertainment venue 822 may be a good site for an interactive machine. However, a financial institution may choose not to put an interactive machine in or near such a live entertainment venue 822 for other reasons. For example, a financial institution that bases advertising on family values may find live entertainment venue 822 incompatible with those values.

Fourth night road segment 809 has heavier traffic. Fifth night road segment 807 serves movie theater 824 primarily and restaurant 841 secondarily. Sixth night road segment 808 brings potential users to the sub-region and directly to many of the shops. Seventh night road segment 809 also includes public transportation stops 826 and 827.

Eighth night road segment 811 carries a significant amount of traffic to and through the sub-region, and may be a good candidate for a drive-in interactive machine somewhere along this route. Eighth night road segment 811 may be determined to be a good candidate for a driver-in an interactive machine because it would serve a large number of users, and of the large number of users it serves, a significant number of those users would be vehicular users.

Potential users of interactive machines can be located within the sub-region in various ways, such as by monitoring credit and debit card use, or by computer monitoring mobile devices such as mobile phones; GPS locators, whether on the potential user's person or vehicle; and credit and debit cards, for the purpose of locating these mobile devices.

Thus, when gathering information about the locations of potential users of the machines, one way to locate the users is to record a location associated with the users each time they make an electronic transaction, a credit card transaction, or a debit card transaction. It is also possible to record a location associated with the users' other financial transactions.

FIG. 5D, FIG. 7, and FIG. 8 illustrate use of one source of information to be used in identifying movement of potential users in the region to identify potential locations for the interactive machines. Additional information can be obtained from other sources, such as the delivery points for ride services like taxis, Uber, and Lyft rides. When a user employs one of these ride-sharing services, some embodiments may record the pickup location and the drop-off location in associated with the ride. Other information may include the potential user's spending habits by store, address, zip code, or any other property or characteristic. For example, each time the user spends money, the characteristics of the transaction are stored. In particular, utilization of interactive machines installed by others may provide valuable information about proclivities to use interactive machines at particular locations. For example, a first financial institution may charge a fee to use an interactive machine, and a second institution may refund that fee to the second institution's customer. The locations for which the second institution is refunding usage fees certainly may be a desirable location for an interactive machine owned by the second institution, particularly if many such refunds are paid. Thus, in some embodiments, the system may identify a location at which the second financial institution is willing to refund fees from the first financial institution's interactive machine. Once such a location is identified, some embodiments may choose that location as a location to situation the interactive machine with the capability to refund fees for user of the first financial institution.

When preferred sites for interactive machines are identified, it may be appropriate to evaluate the proposed site to determine if negative factors outweigh the positive factors. One such evaluation already has been described, viz., a preference not to locate an interactive machine in or near certain entertainment venues.

During evaluation of potential locations for interactive machines, in some embodiments, the financial institution may obtain crime information from other sources. Such crime information may be obtained from police reports and insurance reports, for example. These reports then must be evaluated to determine whether the negative information is sufficient to eliminate a site from consideration. It is possible to gather a variety of crime information from a variety of electronic sources. Once the crime information is gathered, and stored in a database like a GIS database, it may be possible, in some embodiments, to use Natural Language Processing (NLP) algorithms or other machine learning algorithms such as neural networks to take the crime information as input and output a determination as to much of a threat crime presents in a given location.

For example, a threat rating profile may be developed from all information obtained. For example, the reports may report on thefts of property, assaults, muggings, break-ins, and other crimes. The reports also may be sufficient to identify periods of criminal activity. For example, crime may occur most often in the hours businesses in the entertainment region are closed because most of the crime may be break-ins and theft of property. A financial institution may decide to locate an interactive machine in such an area if theft and vandalism of interactive machines is low in that region, because most crime occurs when potential users are not likely to be present.

Figure 9A:
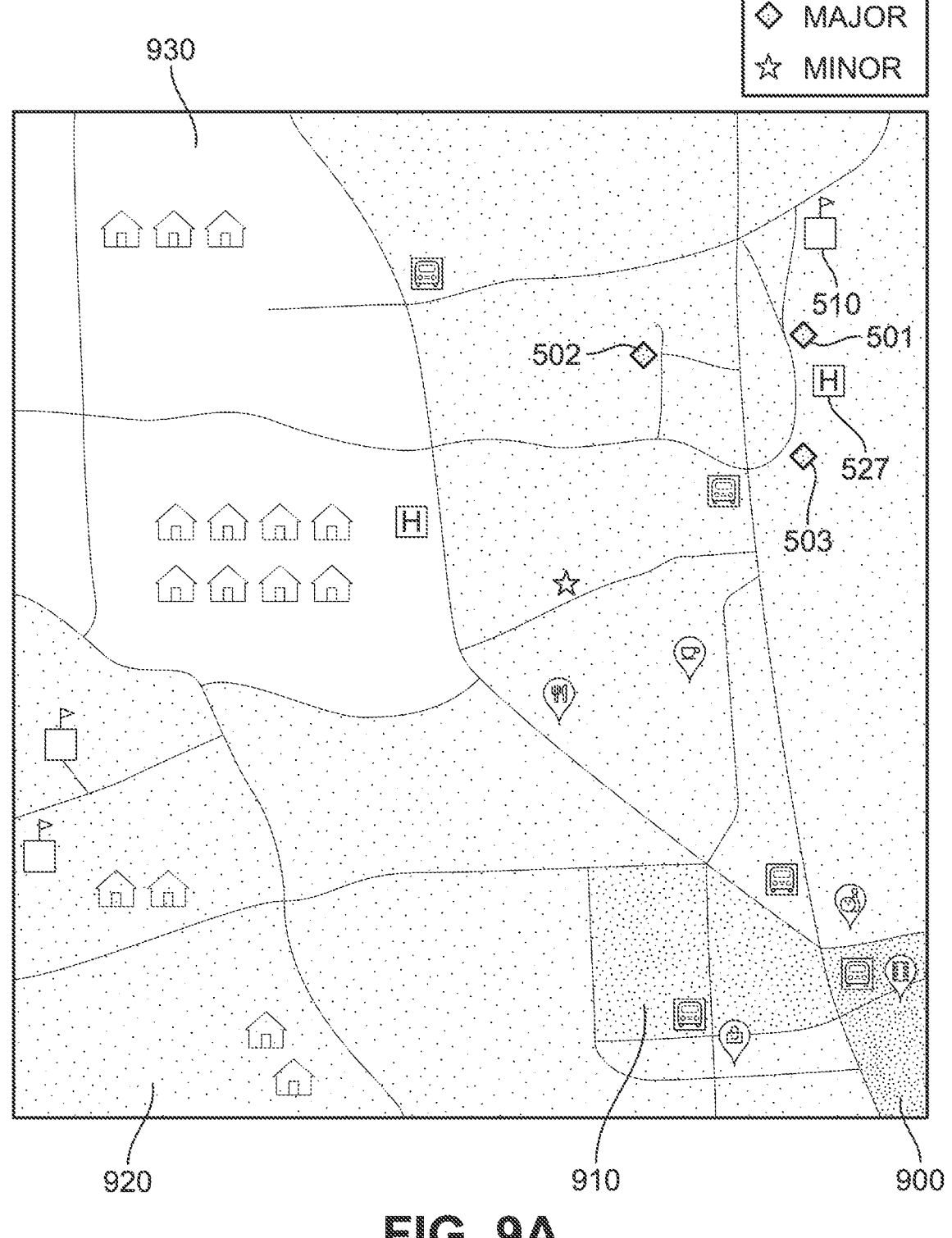
FIG. 9A is a schematic view of frequency of crime in the region, in accordance with an embodiment.
Figure 9B:
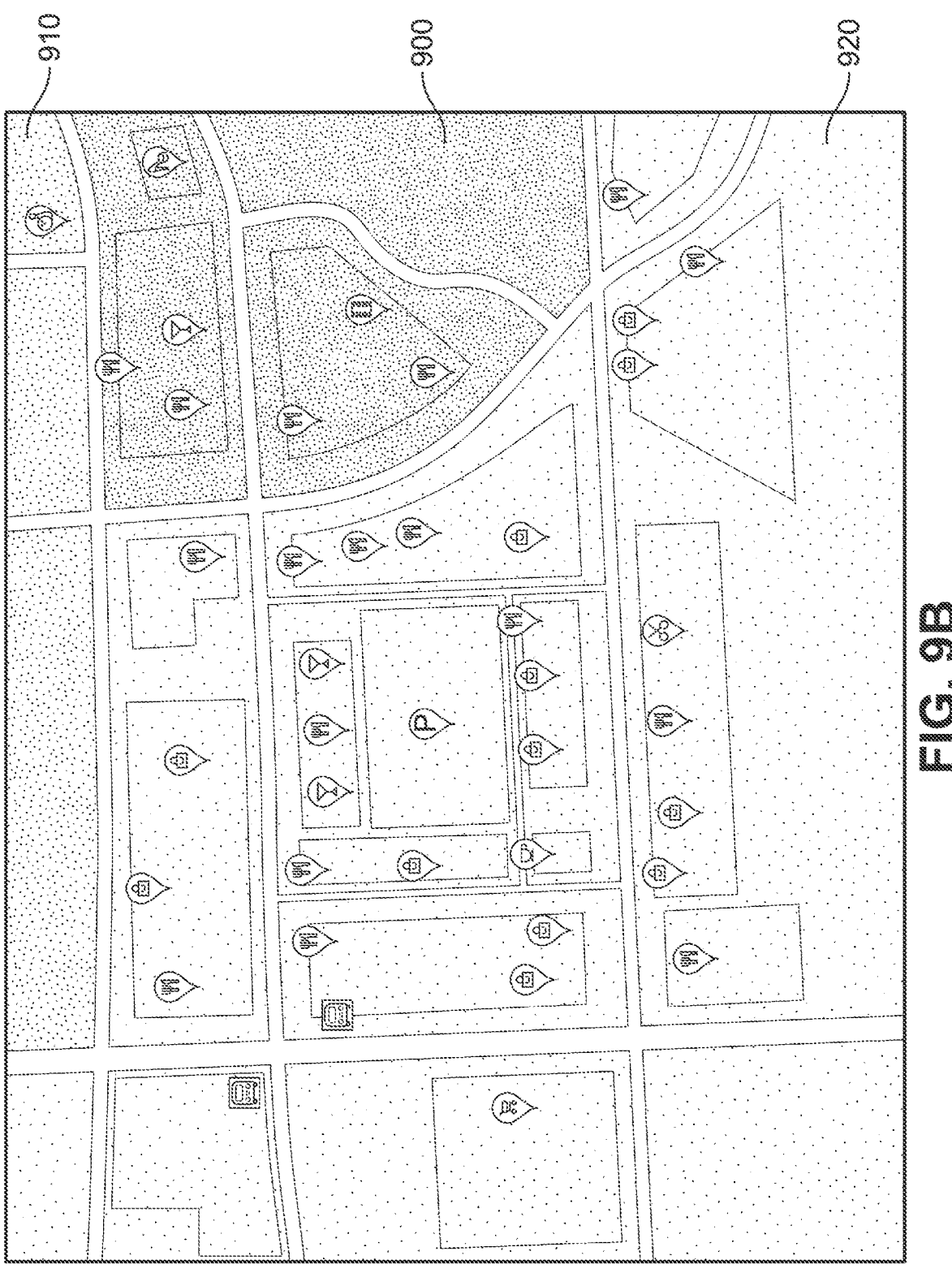
FIG. 9B is a schematic view of frequency of crime in the sub-region, in accordance with an embodiment.

FIG. 9A and FIG. 9B illustrate how crime information can be used to identify an area of crime risk, which then is used to determine whether the crime risk exceeds the value of making a transaction. FIG. 9A illustrates how a threat rating profile, or a crime report, may be overlaid onto an electronic map of the region. FIG. 9A includes the information of FIG. 7, but with shading indicating criminal activity. Various regions of the electronic map of FIG. 9A are shaded in different ways, which may be based on analysis of crime levels. First crime area 900 identifies an area having a significant crime problem. Second crime area 910 identifies an area having significant crime risk or threat rating profile. Third crime area 920 has little crime, and fourth crime area 930 has no crime. Similarly, FIG. 9B illustrates representative first crime area 900, second crime area 910, and third crime area 920 and their relationships to the sub-region illustrated in FIG. 7.

Figure 10:
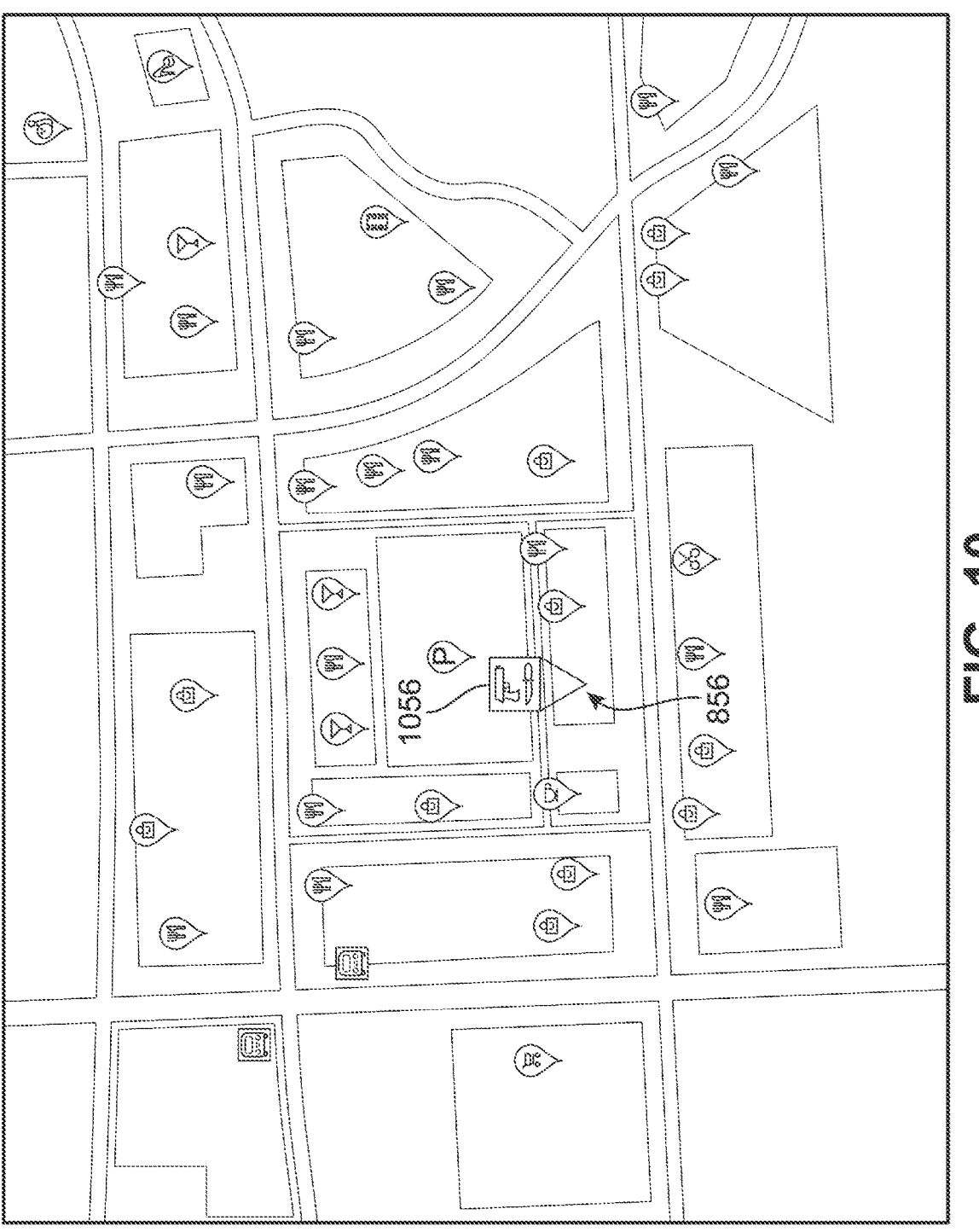
FIG. 10 is a schematic view of frequency of significant crime in the sub-region, in accordance with an embodiment.

As can be seen, most of the entertainment region 700 is in a zone having little crime. However, a closer inspection of crimes occurring within area 920 identifies a murder 1056 that occurred near store 856, as illustrated in FIG. 10. The circumstances of the murder will be of great interest in relation to site selection for an interactive machine. For example, if the murder occurred on the street during prime hours for the entertainment district and was incident to an assault, this crime may make the crime risk exceed the value of making a transaction and preclude placement of an interactive machine in this area. However, if the murder occurred in store 856 at a time that the store was closed, and involved a perpetrator and a victim who knew each other, that murder event may be considered insufficient to affect the location of an interactive machine at a site in or near store 856.

In embodiments, when suitable sites in the region in question have been identified, and a first area has been excluded because the crime risk is judged to exceed the value of making a transaction, the cost of obtaining, installing, and maintaining the interactive machine is compared with a return on investment (ROI) required by the financial institution that proposes to install the interactive machine. For example, a cost profile is calculated by determining the cost of the proposed interactive machine, including signage, the expected cost of installing the interactive machine, including making appropriate utilities available at the site, the cost of those utilities, taxes, environmental fees, cost of protecting the interactive machine from the weather, real estate prices or lease rates, costs of complying with local regulations, cost of loading money into the machine, and any other relevant cost. Thus, a second area in which the business cost exceeds a value that precludes achieving a selected return on investment is identified.

Figure 11:
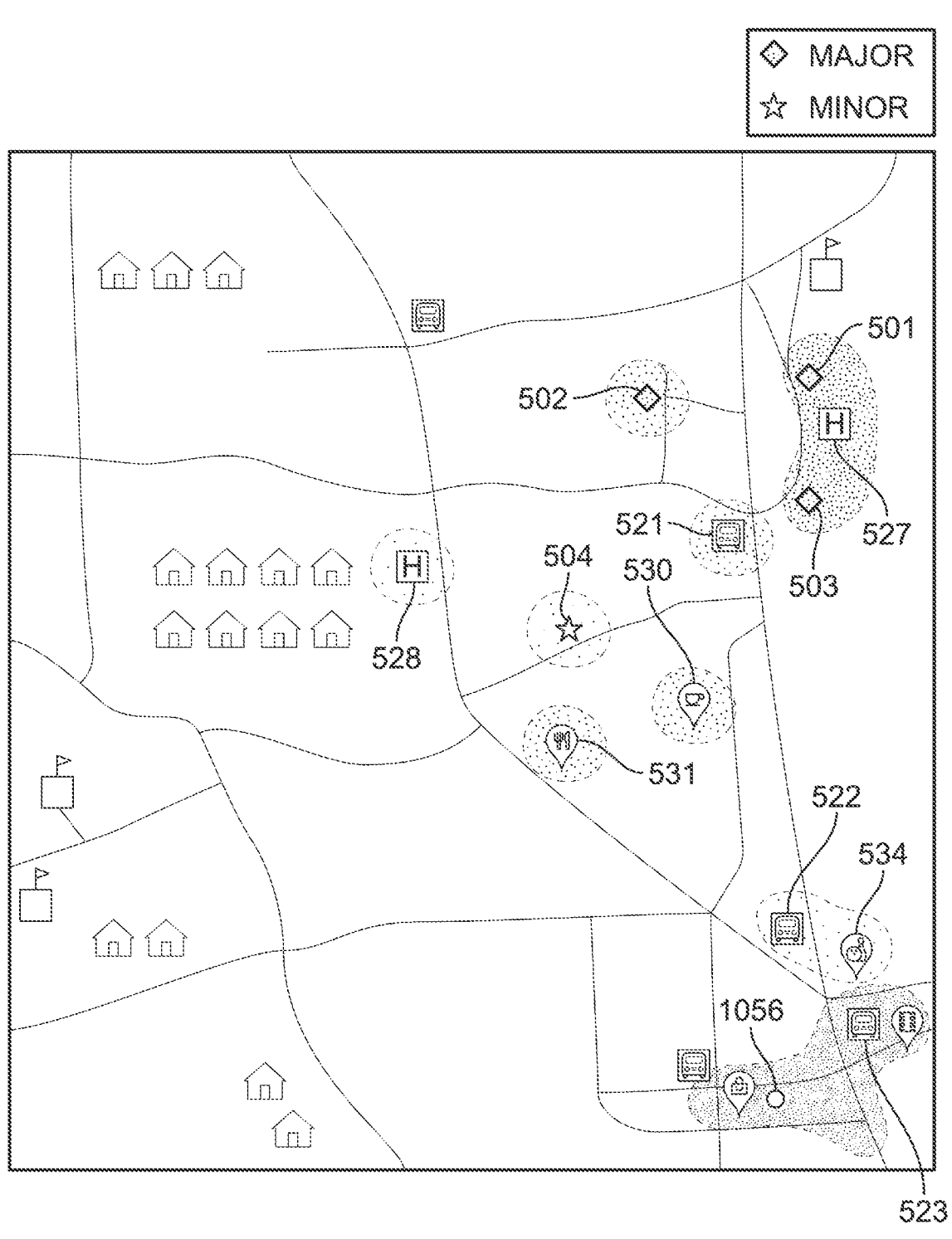
FIG. 11 is a visual representation of the valuation of location of sites for interactive machines in accordance with an embodiment.

FIG. 11 illustrates areas in which the factors in embodiment are favorable and unfavorable for installation sites for interactive machines. FIG. 11 illustrates, for this embodiment, a convenient ranking of the sites into 5 ranks, or levels. In another embodiment, the sites may be ranked or classified in a different manner. A site ranked L0, for example, is not of interest. In contradistinction, art and entertainment area 700 is generally classified as an L4 area. An exception is the area of the murder 956. The embodiment classifies that site as totally unacceptable, as indicated by the blank circle. The size and shape of the exclusion area may differ between embodiments.

FIG. 11 also identifies potential sites at each of L1, L2, and L3. For example, first major base 501 and second major base 503 are illustrated as L3 locations. Hospital 502 and military hospital 527 illustrate L2 locations. Bowling alley 536 and third hospital 528 are identified as L1 sites in this embodiment.

In another embodiment, each of these sites may fall into a different level, or the levels and ranks may be different. For example, if the siting entity gave greater weight to crime statistics, the exclusion area around murder 956 may be greater.

In some embodiments, various specific steps may be taken to identify potential sites and to classify the potential sites into the various levels corresponding to how desirable a given potential site is. As noted above, the desirability of a given site may be based on a number of factors including user movements. To associate a site with a level of desirability, the level may be chosen based on a desirability score associated with the site. The desirability score takes into account how many users are likely to be present at the given site. Further, the desirability score considers characteristics of buildings near a site and characteristics of users near the. Such a desirability score may be calculated using an appropriate model.

For example, the desirability score may be based on a function of a count of users that would use a given site at given times. In particular, the electronic maps presented in FIGS. 5A-5D show how some road segments are associated with varying levels of user activity. The desirability score may be associated with the varying levels of user activity. The level of user activity may be based on a numerical range into the which the desirability score falls. The use and calculation of a desirability score are discussed further, below. When acceptable sites have been identified, sites that present too great a risk due to crime. are eliminated from consideration. Those sites that are not likely to meet the selected ROI or be sufficiently profitable are eliminated. After considering these criteria, an interactive machine may be installed at a suitable site.

Figure 12:
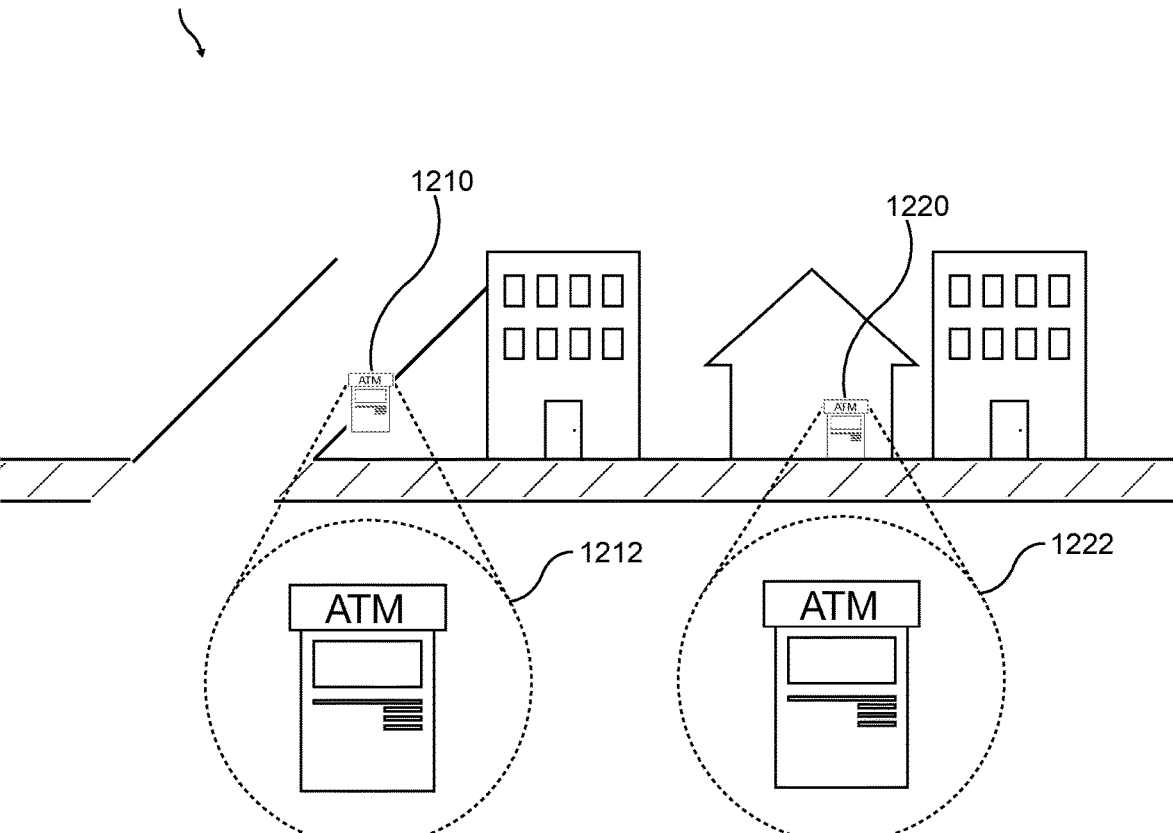
FIG. 12 is a schematic view of an interactive machine installed at a selected site as a drive-thru or a walk-in interactive machine, in accordance with an embodiment.

FIG. 12 is a schematic view 1200 of an interactive machine installed at a selected site as a drive-thru or a walk-in interactive machine, in accordance with an embodiment. FIG. 12 illustrates the installation of drive-thru interactive machine 1212 into site 1210. FIG. 12 shows that drive-thru interactive machine 1212 is installed into site 1210 as a drive-thru machine 1212. FIG. 12 also illustrates the installation of walk-in or walk-up machine 1222 into site 1220. FIG. 12 shows that walk-in interactive machine 1222 is installed into site 1220 as a walk-in machine 1222.

As shown in FIG. 12, sites 1212 and 1222 are selected as desirable sites in accordance with embodiments. For example, embodiments may establish the desirability of a given location for an interactive machine based on factors including a predicted utilization of the interactive machine at a given location, characteristics of users of the interactive machine at a given location, characteristics of buildings near a given location, crime patterns near a given location, and costs and return on investment (ROI) associated with a given location. In the remaining discussion of FIG. 12, each interactive machine of drive-thru interactive machine 1212 and walk-in, or walk-up, interactive machine 1222 is referred to as being an ATM. Other types of interactive machines are also possible. Site 1210 is illustrated as a drive-thru location placed next to a road. Site 1220 is located as a walk-in location placed next to a sidewalk, such as in a mall or collection of business buildings. Thus, site 1210 is suitable for vehicles and site 1220 is suitable for pedestrians.

FIG. 12 shows that a drive-thru ATM 1212 may be placed at location 1210 during a situation in which it is considered to be more desirable to install a drive-thru ATM. FIG. 12 also shows that a walk-in ATM 1222 may be placed at location 1220 when it is considered to be more desirable to install a walk-in ATM. For example, embodiments may determine that there might be a higher utilization of one type of ATM, as discussed further, below. However, there may also be other alternative embodiments in which it is desirable to install both a drive-thru and a walk-in ATM, or an embodiment in which an ATM is designed to serve both vehicles and pedestrians. In such cases, the embodiments may install an ATM 1212 at site 1210 as a drive-thru ATM. The embodiments may also install an ATM 1222 at site 1220 as a walk-in ATM. As described further below, various embodiments take specific steps to determine where to place the ATMs. Embodiments also perform certain steps during the installation of the ATMs and after the installation of the ATMs.

The installation of ATMs shown in FIG. 12 may occur in various ways. For example, embodiments may provide instructions to indicate to a user or to another installing individual where to install the machine and which type of machine to install. For example, embodiments may generate a message for a user with installation instructions for an ATM. Such a message may include information about a location for the ATM. The message may also include information about characteristics of an appropriate ATM. Further, the message may discuss steps involved in an installation or may discuss codes, settings or procedures that facilitate the installation of the ATM. For example, embodiments may provide a list of steps, presented to indicate an ordered series of steps that will allow an installer to successfully install an ATM. Such instructions may also include pictures, sounds, and video to instruct the user how to install the ATM, such as by demonstrating how an ATM may be installed.

It is also possible to use extended reality (XR) to indicate to a user how to install the ATM. Such XR approaches may show a user what it would look like to install the ATM at the desired location. The XR depiction may be a first-person depiction or a third-personal depiction, as examples. However, embodiments may also use automated technology such as robotics to automatically install an ATM. Embodiments may also use technological aides to assist a user in the process of installing the ATM or in activating or interacting with the ATM once installed. For example, embodiments could help a user operate a forklift or another mechanized vehicle to help move the ATM as it is located into the proper place. Alternatively, embodiments could control such a vehicle or apparatus automatically to cause such machines to perform installation of the ATM in the designated location. Alternatively, the interactive machine (ATM/ITM) could be part of or attached to a mobile device that parks at a desired location for consumer utilization (a mobile ATM/ITM).

Figure 13:
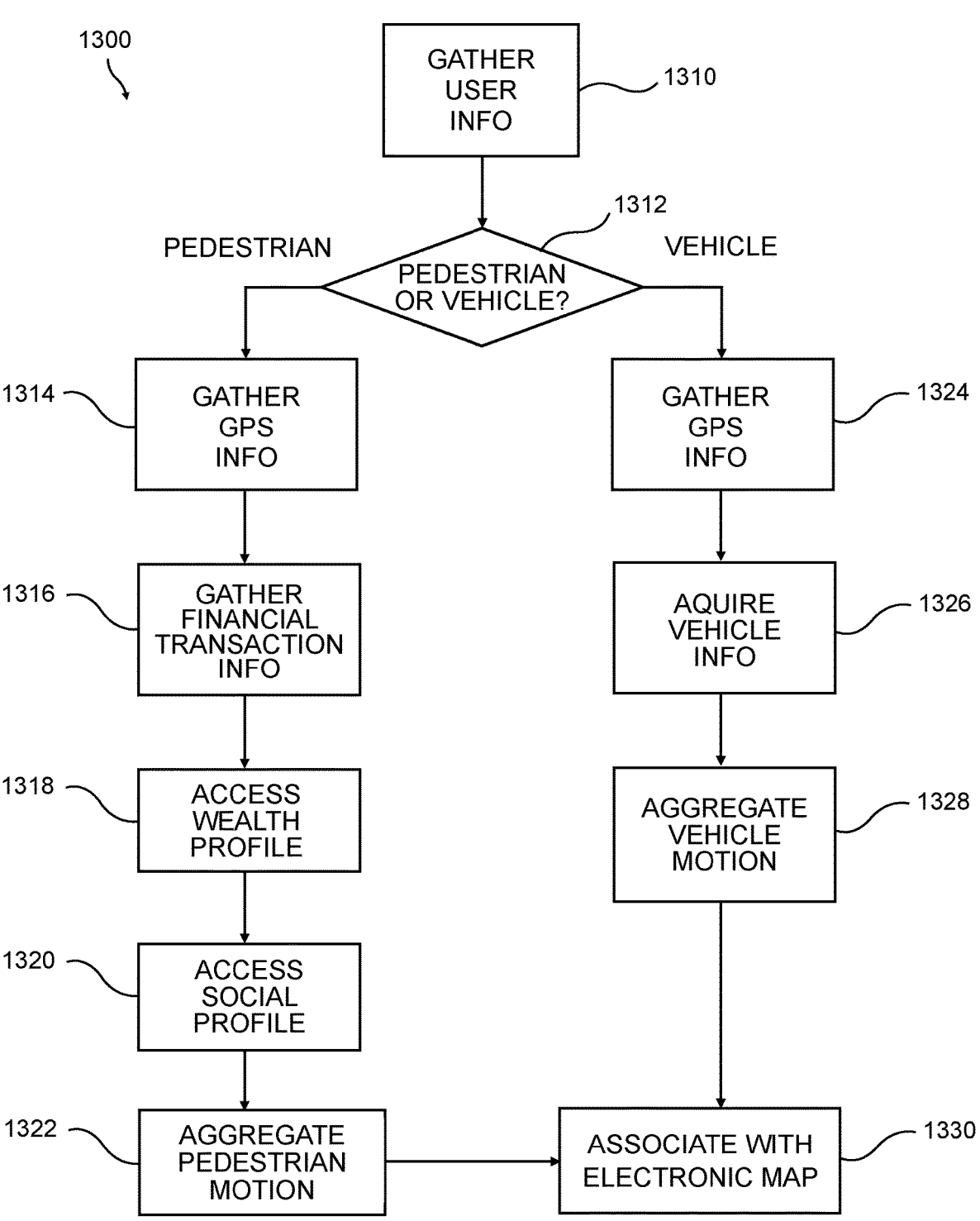
FIG. 13 is a flowchart of gathering user information based on whether the user is a pedestrian or a driver of a vehicle, in accordance with an embodiment.

Additional details of choosing a location to place an interactive machine are discussed with respect to FIGS. 13-23. These embodiments may refer to an Automated Teller Machine (ATM) as an illustrative example of an interactive machine provided in embodiments. Other embodiments are possible using other interactive machines, such as, for example, an Interactive Teller Machine (ITM), stamp dispenser, coupon dispenser, etc. FIG. 13 is a flowchart 1300 of gathering user information based on whether the user is a pedestrian or a driver of a vehicle, in accordance with an embodiment. In step 1310, the method of FIG. 13 gathers user information. Such user information is gathered (or acquired from data providers, business partners, government sources, affiliates, affinity relationships, etc.) for potential customers (who may include existing or new customers) in a geographic region. Tracking users in this way can establish information to be used for locating an ATM at an appropriate location. For example, gathering such user information may include establishing whether the user is a pedestrian or a driver of a vehicle.

In step 1312, the method of FIG. 13 proceeds based on whether a given user is a pedestrian or a vehicle. If the user is a pedestrian, the method continues to step 1314. At step 1314, the method gathers Global Positioning System (GPS) information for the given user. For example, the GPS information may help establish a location of the user. The location may specify a road or building associated with the user's location. Such a location may establish where the user is at various times of day. A GPS sensor is only one way of establishing a location of the user and it will be recognized that other means of using sensors for establishing and tracking user locations may be utilized (information can be acquired from data providers, business partners, government sources, affiliates, affinity relationships, etc.). For example, such location information may be tracked at set times of day. The locations may be synthesized, transformed, and organized to see which potential location or locations are likely to be helpful for that user.

At step 1316, the method gathers (or acquires from data providers, business partners, government sources, affiliates, affinity relationships, etc.) financial transaction information for the user. Such information may include a variety of information about spending by users, which may provide additional insight into user behavior. The financial transactions may also include information about where the financial transactions occur, which can be used as a way to assess where users are as they perform transactions. At step 1318, the method accesses a wealth profile for the user. The wealth profile may include information about assets owned by the user. Such a wealth profile may be aggregated with wealth profiles for other users provide additional insight into user behavior or how a user should be treated. For example, an institution may prefer to locate an ATM where it would be used more often by wealthy clientele. Thus, the wealth profile information may suggest whether a given location is more or less suitable, based on whether the location would serve wealthy clientele and thus be a more profitable location.

At step 1320, the method accesses a social profile for the user (which may be acquired from data providers, business partners, government sources, affiliates, affinity relationships, etc.). Such a social profile also provides additional insight into user behavior. As discussed above, social information can provide additional aspects of trends in a wealth profile as well as information such as belonging to an organization (such as a club) or affiliation with a type of organization (such as the military). The social information establishes characteristics of users that would cause them to use a particular kind of machine, or a machine located near a particular type of building. The social information may be factored into the scoring process that determines if a location is a good location for an ATM.

Finally, at step 1322, based on the GPS information as well as other sources of information, the method of FIG. 13 aggregates pedestrian motion. Such aggregation allows embodiments to consider all of the factors associated with pedestrian motion. Once the pedestrian motion is aggregated in step 1322, the pedestrian motion information may be associated with an electronic map in step 1330 to help organize the pedestrian motion information. In step 1330, the pedestrian motion information may be transformed to correspond to a structure that allows the embodiments to assess how much pedestrian traffic a given location would have. As transformed, the pedestrian motion information may help guide a decision about where to situate an ATM.

However, if the user is associated with a vehicle, the method of FIG. 13 gathers somewhat different information after step 1312. In step 1324, the method may gather information about vehicle's location using a GPS. However, a GPS is only one way of establishing a location of the user and it will be recognized that other means of establishing and tracking user locations may also be utilized (data may be acquired from data providers like Axiom®/Google®/Facebook®, business partners, government sources, affiliates, affinity relationships, etc.). In step 1326, the method acquires vehicle information. Such vehicle information may include information about attributes of vehicles, information acquired from sensors of vehicles, and information about occupants of the vehicles. For example, if vehicles are luxury cars or if vehicles are well-maintained it may indicate that the drivers of those vehicles would be desirable customers for an ATM. As another example, the information could include information related to financial transactions associated with a driver of the vehicle or information related to a wealth profile or a social profile of a passenger of the vehicle. In step 1328, the method aggregates vehicle motion information. Such aggregation is related to that of step 1322, except that the data being aggregated is data associated with vehicles and occupants of such vehicles. The data may be aggregated to transform the raw data into another format which is suitable for consideration to assess sites for the placement of an ATM.

Thus, once the pedestrian information has been gathered in steps 1314, 1316, 1318, 1320, and 1322 and the vehicle information has been gathered in steps 1324, 1326, and 1328, the pedestrian information and the vehicle information are associated with an electronic map in 1330. Examples of such electronic maps are provided at FIGS. 5A-5D and FIG. 17. Based on a particular use case, the method of FIG. 13 may be used to gather only information for a pedestrian, only information for a vehicle, or information for both a pedestrian and a vehicle. Such information may then be used subsequently to assess how suitable a given location is for placing an ATM. The information may also establish the relative suitability of a walk-in ATM and a drive-thru ATM.

Figure 14:
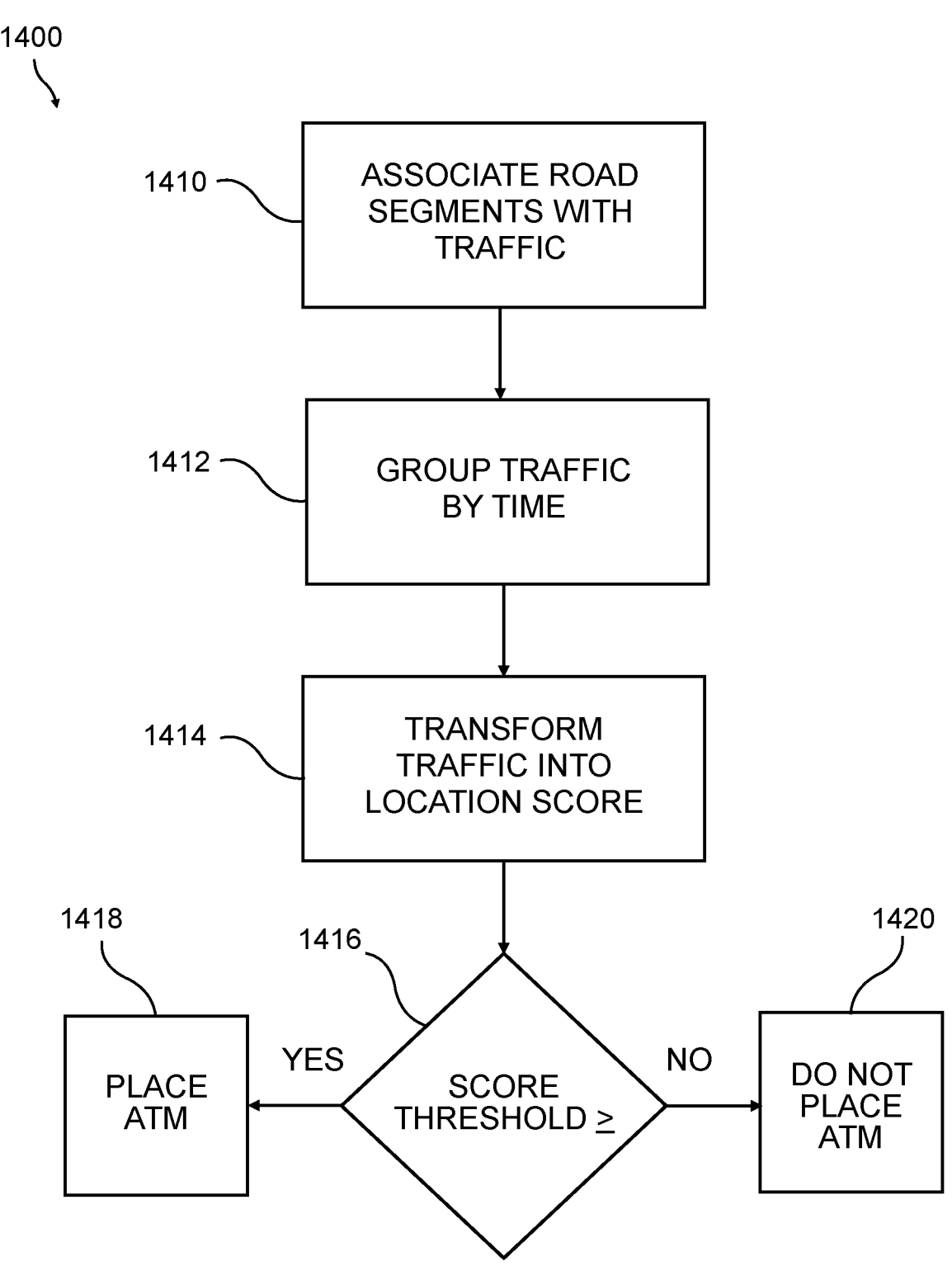
FIG. 14 is a flowchart of scoring potential locations for interactive machines and making placement decisions accordingly, in accordance with an embodiment.

FIG. 14 is a flowchart 1400 of scoring potential locations for interactive machines and making placement decisions accordingly, in accordance with an embodiment. In FIG. 14, in step 1410, the method begins by associating road segments with traffic. Such associating may include locating users (existing customers or desired customers) and determining which road segments coincide with the locations of the users. In step 1412, the method then groups traffic by time. For example, the time groups may include morning time (such as 7 AM to 7 PM) and evening time (such as 7 PM to 7 AM) groups. However, these are only examples of time groups. There may be more time groups, and the times involved may be different.

In step 1414, the method transforms the traffic into a location score. Greater details of such a transformation are presented, below. The transformation obtains information related to user movement and characteristics. The transformation also considers characteristics of various locations, such as buildings near the location. The transformation aggregates and transforms the information to generate a location score that represents how desirable (to consumers and/or to the provider) a given location would be as a site for an ATM. Once the score is obtained in step 1414, in step 1416, the method compares the obtained score to a threshold value. Such a threshold value may establish that there is sufficient reason to place an ATM at a given location. In step 1418, the method establishes that the score is greater than or equal to the threshold value. In step 1418, the method that places an ATM at the relevant location. However, in step 1420, the method determines that the score is less than the threshold value, and the method does not place an ATM.

Figure 15:
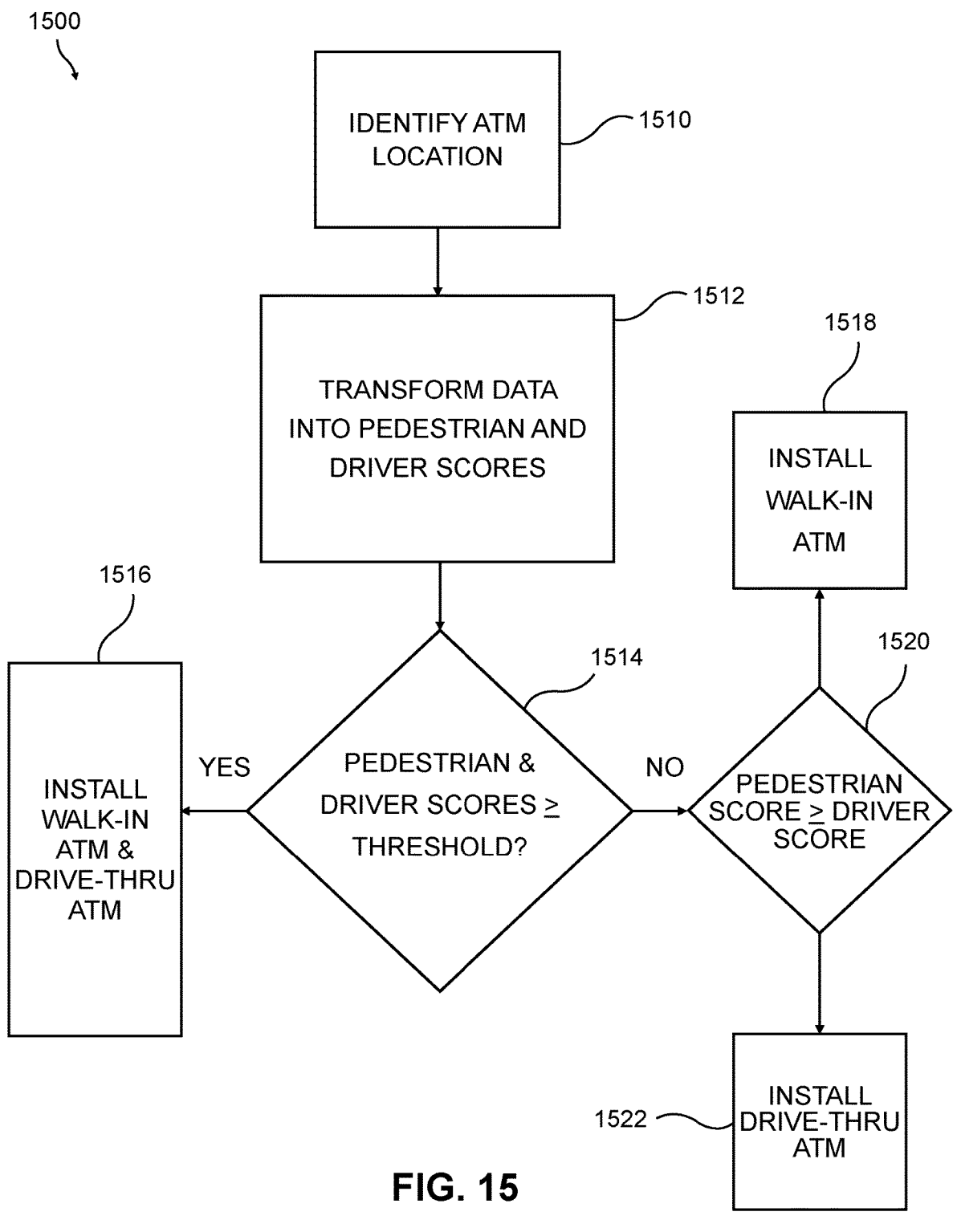
FIG. 15 is a flowchart of obtaining pedestrian and driver scores and installing an appropriate type of ATM accordingly, in accordance with an embodiment.

FIG. 15 is a flowchart 1500 of obtaining pedestrian and driver scores and installing an appropriate type of ATM accordingly, in accordance with an embodiment. In step 1510, the method identifies an ATM location. For example, analysis of the information from the electronic map recorded in FIG. 13 at step 1330 may identify a potential location for installing an ATM. The electronic map may present a number of potential locations produced based on identifying locations associated with a certain amount of population density or with particular types of buildings that are considered to be a good possible site for situating an ATM. For example, the electronic map may show that there are many users resident in an area or that there is a large amount of traffic on a given road or near a given building. The electronic map may also show a building that makes a particular machine especially lucrative. For example, a location near a military base may be especially useful if an interactive machine has features useful to military personnel.

In step 1512, the method transforms data (using any of numerous statistical methods including linear regression, logistic regression, support vector machines, etc.) associated with the potential location into pedestrian and driver scores. Additional details of such transformation are presented in the discussion of FIG. 19. These separate scores establish how appropriate ATM placement would be as a walk-in ATM as compared to a drive-thru ATM. The scores are associated with information related to pedestrians and drivers, respectively. However, driver scores may also be at least partially based upon information based on passengers who travel with the drivers. In step 1514, the method determines whether both the pedestrian score and the driver score are greater than or equal to a threshold value. This threshold value may be the same value as that used in step 1416 or may be a different threshold value. Alternatively, the pedestrian score and the driver score may be compared to different thresholds at step 1514. If the scores meet the requirements of step 1514, in step 1516, the method installs both a walk-in ATM and a drive-thru ATM at the location under consideration, as the method has determined that the site in question is suitable for both types of ATM. Alternatively, in step 1516, the method installs an ATM that may operate in both roles. However, if step 1514 finds that, based on the score comparison, it is not appropriate to install both a walk-in ATM and a drive-thru ATM, the method proceeds to step 1520.

In step 1520, the method determines whether the pedestrian score is greater than or equal to the driver score. While step 1520 shows a direct comparison between the pedestrian score and the driver score, there may be a normalization step before the scores are compared, such as adding or multiplying one of the scores by a weighting factor. If step 1520 determines that the pedestrian score is greater than or equal to the driver score, the method may install a walk-in ATM at step 1518. If step 1520 determines that the driver score is less than the pedestrian score, the method may install a drive-thru ATM at step 1522. While FIG. 15 shows an example in which a walk-in ATM is installed if the scores are the same, embodiments are also possible in which a drive-thru ATM is installed if scores are the same, or both a walk-in ATM and a drive-thru ATM are installed if scores are the same. In general, at least one ATM should be installed. FIG. 15 assumes that by the end of step 1510, a location is identified that is appropriate for installing an ATM in at least one location.

Some embodiments may include provisions for determining whether given locations are suitable for placing an interactive machine. In some embodiments, the interactive machine may be an automated teller machine (ATM). In some cases, the interactive machine may be an interactive teller machine (ITM). In some embodiments, the locations are derived using Global Positioning System sensors (GPS) or data from other sources (or acquired from data providers, business partners, government sources, affiliates, affinity relationships, etc.). In some cases, the locations are derived using other hardware location equipment. In some embodiments, the locations are associated with the placement of a drive-thru ATM or a walk-in ATM. In some cases, the embodiments gather information to help determine which type or types of ATM to install. In some embodiments, the information includes information about pedestrians. In some cases, the information about pedestrians includes financial transaction information, wealth profile information, or social profile information. In some embodiments, the information about drivers. In some cases, the information includes information about vehicles, such as the value of the vehicle or its age. In some embodiments, the information includes information about drivers or passengers of the vehicles.

Figure 16:
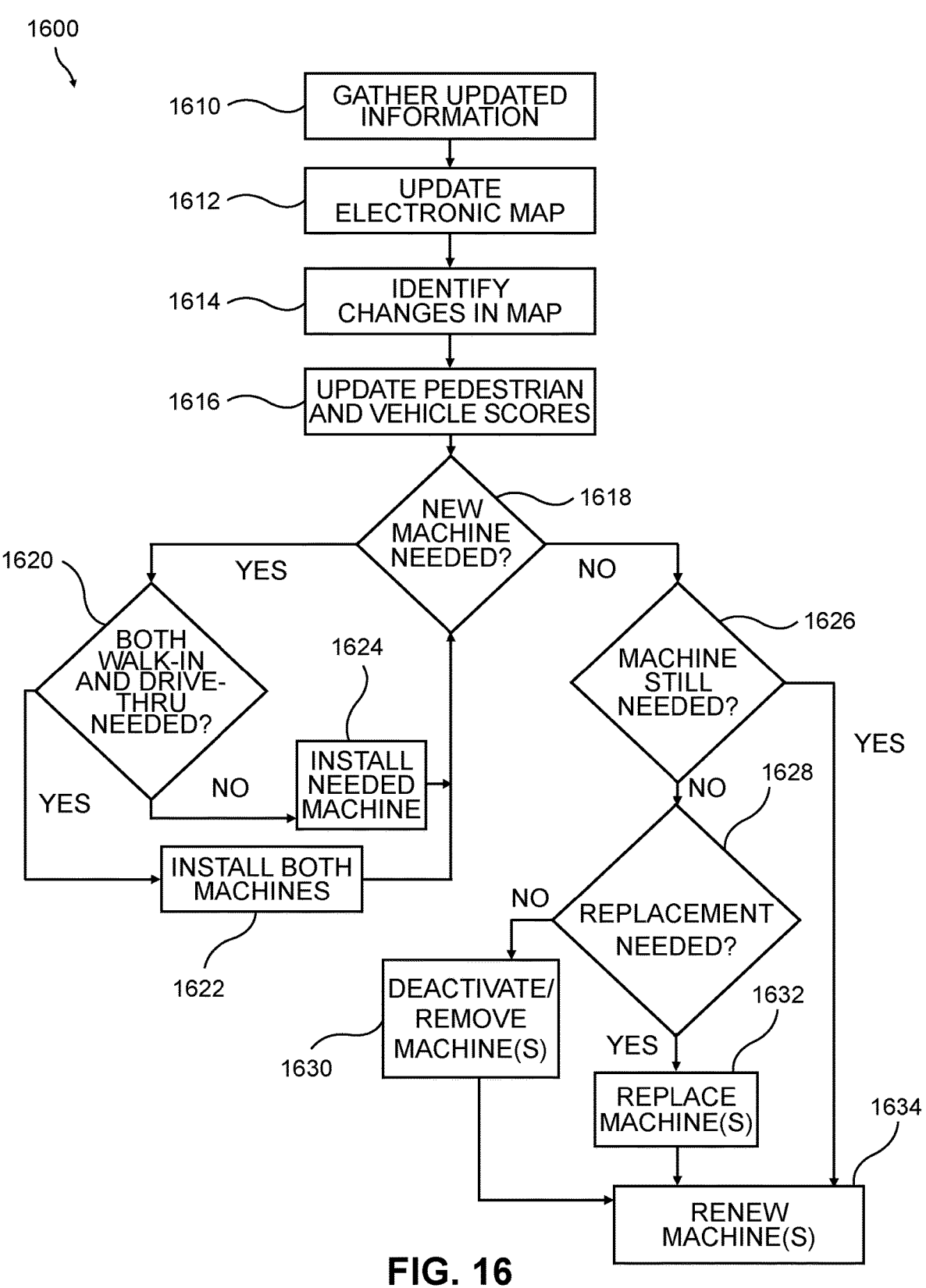
FIG. 16 a flowchart of updating ATM placement as circumstances change in a geographic region, in accordance with an embodiment.

FIG. 16 a flowchart 1600 of updating ATM placement as circumstances change in a geographic region, in accordance with an embodiment. In step 1610, the method gathers updated information about user behavior. For example, step 1610 may include performing the steps shown in FIG. 13 again. By performing these steps again, step 1610 obtains updated information about user movements. Such updated information reflects user movements at a time subsequent to when the user movements were originally tracked. Accordingly, once the updated information is obtained in step 1610, in step 1612, the method updates the electronic map. Such updating rebuilds the electronic map using the newly obtained information. Once step 1612 is complete, the method may identify changes in the map in step 1614. For example, in step 1614, the method may identify changes in the electronic map by taking the originally obtained electronic map and comparing the originally obtained electronic map to the updated electronic map obtained in steps 1610 and 1612. For example, in step 1614, the method may determine if there have been changes to population distribution, road usage, building locations, and so on.

Once the electronic map is updated, in step 1616, the electronic map may allow for an updating of pedestrian and vehicle scores, based on the changes to the electronic map identified in step 1614. Such scoring uses similar techniques to generate scores as used previously in FIGS. 14-15, but is based on the updated information obtained in steps 1610 and 1612 and identified in step 1614. In step 1618, the method may make a determination as to whether a new or different machine (capacity, function, durability, etc.) is needed. Such a determination may be based on a determination that a score obtained in steps 1610, 1612, 1614, and 1616 exceeds a threshold for placing an ATM in a case where it did not previously do so. If step 1618 determines that a new machine is needed, the method continues at step 1620. At step 1620, the method determines whether both a walk-in and a drive-thru ATM are needed. If so, the method proceeds to step 1622 and installs both a walk-in and a drive-thru ATM. If not, the method proceeds to step 1624. At step 1624, the method installs the needed new machine. If a walk-in ATM is preferable, at step 1624, the method installs a new walk-in ATM. If a drive-thru ATM is preferable, at step 1624, the method installs a new drive-thru ATM.

After step 1618 determines that a new machine is needed, step 1622 installs both machines, or step 1624 installs a needed machine, the method proceeds to step 1626. Step 1626 determines whether a given ATM is still needed. If not, the method proceeds to step 1628, which determines if a replacement machine is needed. If a replacement machine is not needed, the method proceeds to step 1630, in which the method deactivates or removes machines in accordance with the determination in step 1628 that a replacement is not needed.

However, if step 1628 determines that a replacement machine is needed, the method continues to step 1632, which replaces at least one machine as needed. Here, a replacement indicates that an existing machine may be deactivated or removed and another machine installed in its place. Finally, if step 1626 determines that a machine is still needed, if step 1630 has deactivated or removed machines, or if step 1632 has replaced machines, the method concludes with step 1634, which renews machines. When machines are renewed, the method takes any requisite action so that existing machines that are still needed may continue to operate, such as sending a signal, code, or instruction that the machines should continue to operate.

Some embodiments may include provisions for ensuring that the locations of ATMs remain appropriate. In some embodiments, the embodiments periodically update information about where ATMs should be located. In some cases, the embodiments update information about where ATMs should be located when instructed to do so by a user. In some embodiments, the updated information is integrated into an electronic map. In some cases, the electronic map is compared (such as by using statistical methods or mathematical methods) to an earlier electronic map to see what has changed. In some embodiments, these changes are used to update scoring. In some embodiments, observed changes, such as in an electronic map (for example, based on significant GIS data changes) or a score, determine whether to install a machine. In some cases, a determination is made as to whether a walk-in, a drive-thru, or both machines should be installed. In some embodiments, the machines may be installed appropriately. In some cases, the installation involves providing instructions to a user. In some embodiments, the instructions include providing at least one of text, video, and audio. In some cases, the instructions are provide using extended reality (XR), such as augmented reality (AR) or virtual reality (VR). In some embodiments, a determination is made if a new machine or different (functionally) machine is needed. In some cases, both a walk-in and a drive-thru machine are deemed necessary. In some embodiments, only one of a walk-in machine and a drive-thru machine is deemed necessary. In some embodiments, existing machines may be considered to see if they are still needed. In some cases, unneeded machines may be deactivated, removed, or replaced, while needed machines may be renewed or set to continue to run.

Figure 17:
FIG. 17 is an example electronic map showing details of information used to consider locations to place an ATM, in accordance with an embodiment.

FIG. 17 is an example electronic map 1700 showing details of information used to consider locations to place an ATM, in accordance with an embodiment. Such an electronic map 1700 uses technology (such as electronically calculated statistical methods and/or electronically performed data manipulation) to consolidate, model, organize, transform information and present user movements, user characteristics, and characteristics of regions and buildings in a geographic area. For example, the electronic map 1700 includes areas 1710, 1712, 1714, and 1716. As shown in the electronic map 1700, area 1710 corresponds to ZIP 10001, and includes 4500 residents. Area 1712 corresponds to ZIP 10002, and includes 5000 residents. Area 1714 corresponds to ZIP 10003, and includes 2500 residents. Area 1716 corresponds to ZIP 10004, and includes 2000 residents.

The electronic map also includes road segments and sites. For example, the electronic map 1700 includes road #1 1720, road #2 1722, road #3 1724, and road #4 1726. The electronic map 1700 also includes site #1 1730, which is a gas station. The electronic map 1700 also includes site #2 1732, which is a military base. The electronic map 1700 also includes site #3 1724, which is a restaurant. The electronic map 1700 also includes site #4 1726, which is a shopping center. In order to select an ATM site, an embodiment may consider characteristics of traffic associated with a given road segment at various times of day, including both quantity and user characteristics. An embodiment may also consider characteristics of at least one building situated on the road segment. This information is processed, as shown in greater detail in FIG. 19, to yield a metric such as a score that indicates which road segments are associated with desirable locations for an ATM.

Electronic map 1700 includes several additional pieces of information that are of use when siting an ATM. For example, the siting may require that the ATM be sited in or next to at least one area with a threshold number of residents. For example, the siting may require that the ATM be sited in or next to a location with a threshold number of residents. If such a threshold is 3000 residents, it would be appropriate to place the ATM in or next to region 1710 or 1712, but not in or next to region 1714 or 1716. Moreover, the embodiments may track user movement by determining how busy each road segment is, such as each road segment of road #1 1720, road #2 1722, road #3 1724, and road #4 1726. The tracking may also correspond to different times of day. Such tracking is shown in greater detail in FIG. 18. Additionally, the sites shown in the electronic map 1700, such as site #1 1730, which is a gas station, site #2 1732, which is a military base, site #3 1734, which is a restaurant, and site #4, which is a shopping center 1736, may each have an effect of how desirable a given site is for situating an ATM.

Figure 18:
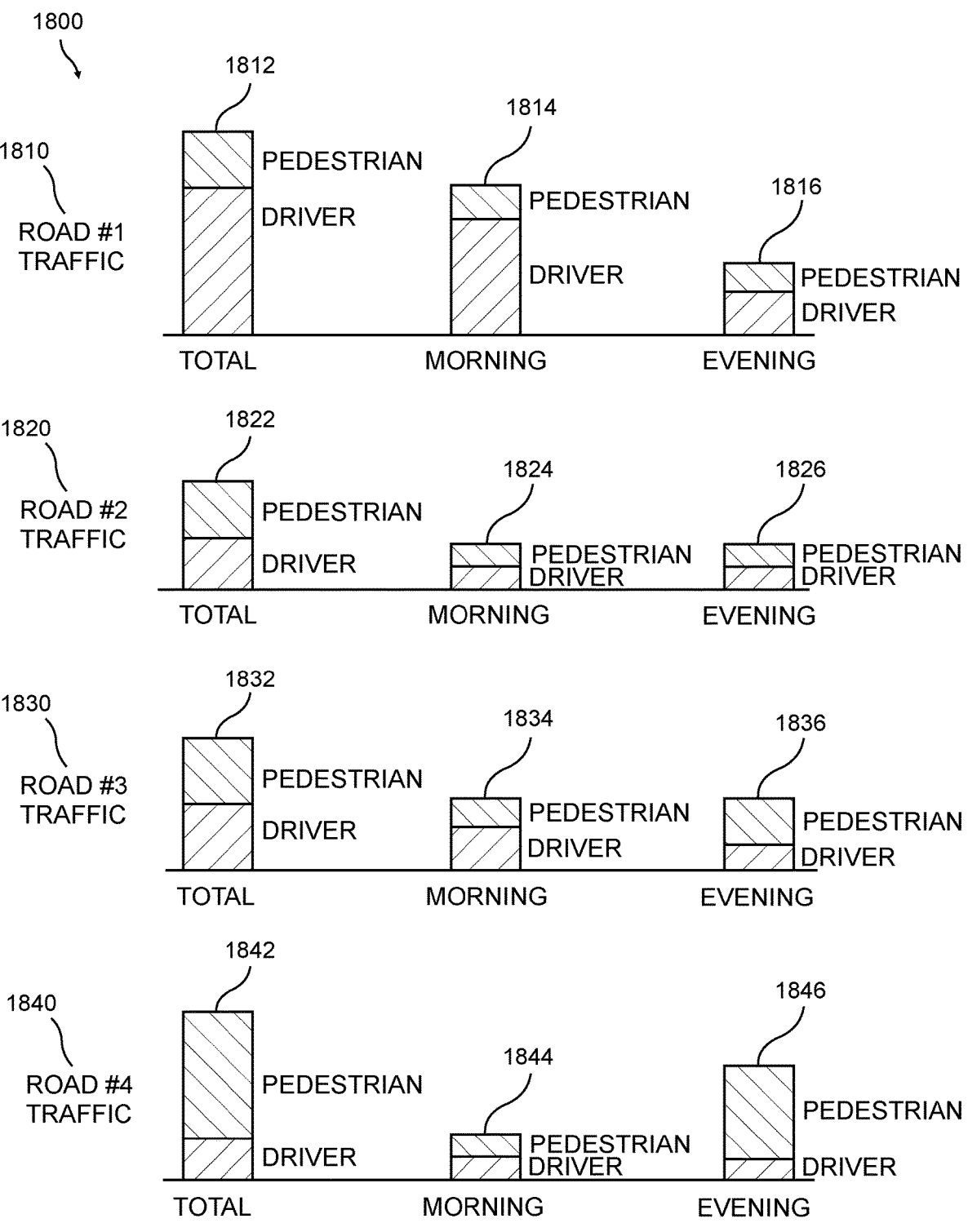
FIG. 18 is an example of stacked bar graphs showing how busy various roads are at various times, in accordance with an embodiment.

FIG. 18 is an example of stacked bar graphs 1800 showing how busy various roads are at various times (for example, a similar report could be created from a GIS database organized by date instead of time of day), in accordance with an embodiment. For example, bars 1810 show traffic that may be associated with road #1, bars 1820 show traffic that may be associated with road #2, bars 1830 show traffic that may be associated with road #3, and bars 1840 show traffic that may be associated with road #4. For example, bars 1810 may include total bars 1812, which portray the total traffic associated with road #1 as divided into pedestrian and driver traffic. The bars 1814 divide morning traffic associated with road #1 into pedestrian and driver traffic, while the bars 1816 divide evening traffic associated with road #1 into pedestrian and driver traffic. Bars 1820 may include total bars 1822, which portray the total traffic associated with road #2 as divided into pedestrian and driver traffic. The bars 1824 divide morning traffic associated with road #2 into pedestrian and driver traffic, while the bars 1826 divide evening traffic associated with road #2 into pedestrian and driver traffic.

Bars 1830 may include total bars 1832, which divide the total traffic associated with road #3 into pedestrian and driver traffic. The bars 1834 portray morning traffic associated with road #3 as divided into pedestrian and driver traffic, while the bars 1836 divide evening traffic associated with road #3 into pedestrian and driver traffic. Bars 1840 may include total bars 1842, which portray the total traffic associated with road #4 into pedestrian and driver traffic. The bars 1844 divide morning traffic associated with road #4 into pedestrian and driver traffic, while the bars 1846 divide evening traffic associated with road #4 as divided into pedestrian and driver traffic. Thus bars 1810, 1820, 1830, and 1840 provide a visual depiction of how roads may be different amounts and types of traffic, as well has how such traffic may differ at different times of day. The bars may also help organize information, and help explain associated decisions for decisions authorities, regulators, and others, as embodiments process traffic information as part of the scoring process.

By considering how much traffic is associated with a given road, as well as when the traffic occurs and how much of the traffic is associated with drivers and pedestrians, it is possible to gather the data needed for making appropriate decisions about where to situate a given ATM. For example, measuring, transforming, and analyzing the data presented in FIG. 18 may indicate which roads would have the most traffic overall, would have the most traffic at particular times, or would be more valuable for a walk-in ATM or a drive-thru ATM.

FIG. 18 thus shows amounts of transactions that may be associated with different roads. Based on these amounts, the roads may be compared to certain minimum numbers of transactions. Also, the numbers of transactions may be associated with different metrics depending on the numbers of transactions. For example, the transactions could be considered such that in order for an ATM placement to be considered a viable candidate, if the ATM under consideration is for a walk-in placement, the analysis could expect greater than 500 transactions per day, or greater than 300 transactions during the morning. Alternatively, if the ATM under consideration is for a drive-thru placement, the analysis could expect greater than 750 transactions per day, or greater than 450 transactions during the evening.

Some embodiments may include provisions for assessing the relative desirability of various locations. In some embodiments, locations may be ranked relative to one another. In some cases, locations may have a qualitative grade for desirability, such as "B" or "Somewhat Desirable." In some embodiments, locations may be associated with a quantitative numerical score. In some cases, the numerical score may be a fractional score such as 76 points out of 100 points. In some embodiments, the numerical score may be a combination of various desirability factors. In some cases, the numerical score may be a weighted sum of numerical values associated with desirability factors. In some embodiments, the numerical score may combine such numerical values associated with desirability factors in other ways. In some cases, at least one of the desirability factors is an amount of traffic associated with a given location, such as a road segment. In some embodiments, the relevant amount of traffic pertains to a time of day, such as daytime or evening. In some cases, the desirability may also consider numbers of users in areas adjacent to a road segment. In some embodiments, the desirability may be based on other characteristics of a location. In some cases, the location is associated with a score based on a type of building, such as a military base or a shopping center. In some embodiments, the location is associated with characteristics of the area itself, such as weather, topography, and so on. In some embodiments, the desirability may be based on characteristics of potential users, such wealth or social affiliations of groups of users near a potential location.

In some cases, these desirability factors are weighted evenly. In other cases, the desirability factors may be weighted differently, such as in use cases where it is very important to consider the role of nearby buildings or consider the role of relevant users, or when types of information are not as important. In some embodiments, a location's desirability may be affected by crime near that location. In some cases, crime near a location is analyzed and considered to see if it falls within an acceptable range. In some cases, a score may be nullified or greatly reduced due to a circumstance like murder at a specific location—a veto or disqualification of a setting. In some embodiments, a location's desirability may be affected by return on investment (ROI) for that location. In some cases, ROI for a location is analyzed and considered to see if it falls within an acceptable range. In some embodiments, crime or ROI could also be considered by transforming them into a scoring and considering these factors based on the influence they have on the adjusted score produced above. The capacity to add an ATM also depends on the availability of the real estate at the desired location. Available real estate will need to be reviewed in order to determine which site has the best match with the desired traits.

Figure 19:
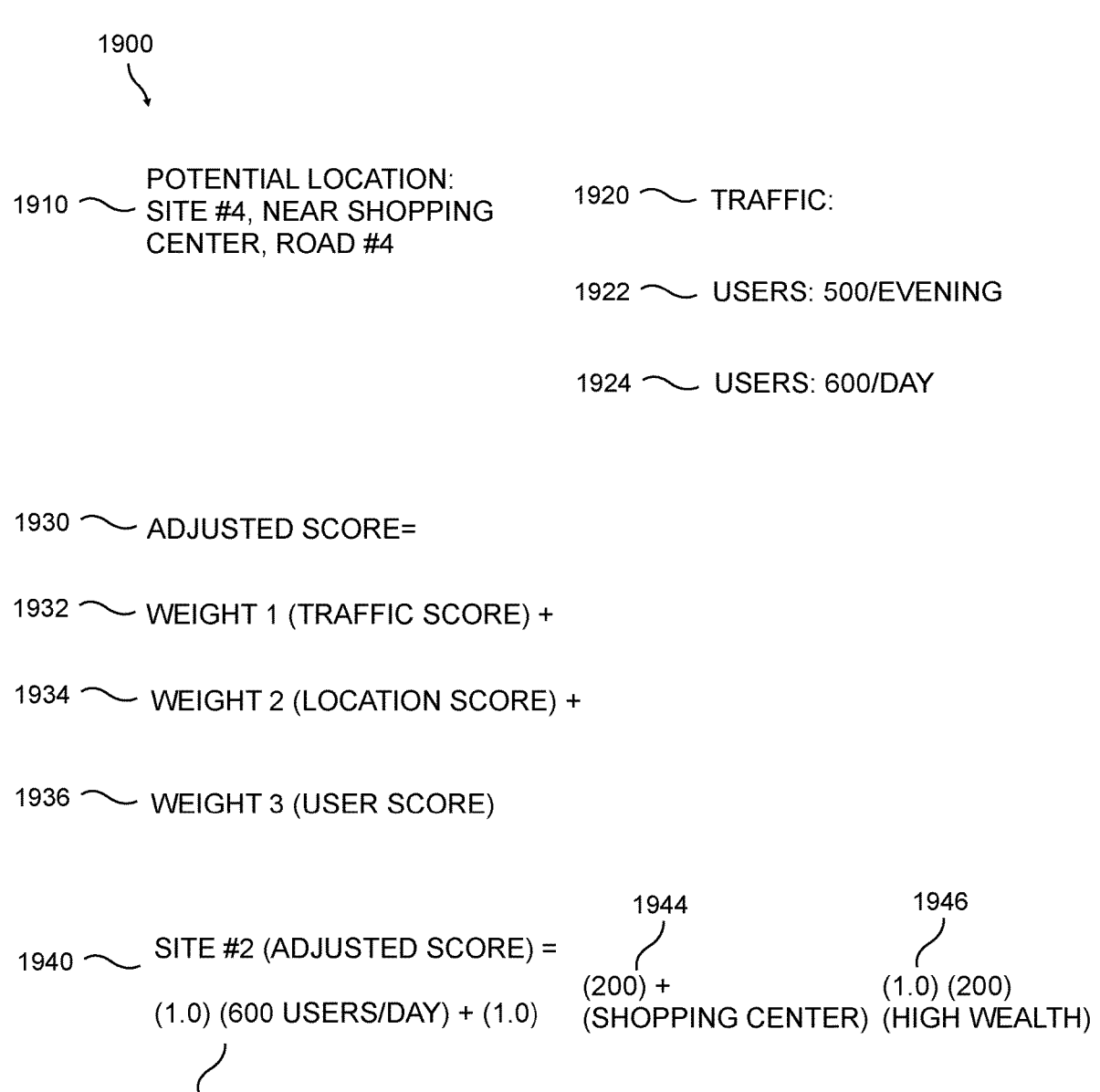
FIG. 19 is an example diagram of using a formula to find a score for a candidate location to place an ATM, in accordance with an embodiment.

A more detailed example of scoring is provided with respect to FIG. 19. FIG. 19 is an example diagram 1900 of using a formula to find a score for a candidate location to place an ATM, in accordance with an embodiment. For example, FIG. 19 shows how a particular location shown in the electronic map of FIG. 17 could be scored. More specifically, potential location 1910 would be situated at a location on road #4 1726, near site #4 1736 that is a shopping center, between regions with 5000 residents and 2000 residents. FIG. 19 shows, at potential location 1910, that the diagram is considering (which may be based on, for example, electronic statistical analysis of GIS data) a potential location 1910 such that the potential location 1910 would be at road #4, near site #4, and would be considered as a walk-in location (providing service for pedestrians).

FIG. 19 shows traffic information 1920 about how busy the potential location 1910 is. The traffic information 1920 may include information about traffic associated with the potential location 1910. For example, the information includes the information 1922 that the location may have 500 users present at the potential location 1910 at some point per evening, and the information 1924 that the location may have 600 users present at the potential location 1910 at some point per complete day. While not shown in this example, it would also be possible to take into account how much time a given spends at or near the potential location 1910. FIG. 19 also shows how to find an adjusted score 1930 that may be used to assess how appropriate a given location is as a choice to situate an ATM—which may be all performed electronically using automated statistical methods and the data such as data from the electronic map.

For example, the adjusted score 1930 may be found as follows. However, it will be recognized that the following is only an example formula, and other information and other ways of combining information may be used in other embodiments. For example, the adjusted score 1930 may be a weighted sum of various pieces of information. For example, the adjusted score 1930 may include a sum of a first weight (Weight 1) multiplied by a traffic score 1932, a second weight (Weight 2) multiplied by a location score 1934, and a third weight (Weight 3) multiplied by a user score 1936.

The traffic score 1932 is a number that reflects how many users travel through a given road segment. The traffic score may consider a time of day. The traffic score 1932 may also consider a day of the week. The traffic score 1932 may also consider pedestrian users, vehicular users, or both. The traffic score 1932 may initially be a raw count of usage, but may be multiplied by a weight that may cause it to have a larger or smaller influence on the adjusted score 1930 based on a given use case.

The location score 1934 is a number that reflects at least one factor based on aspects of the potential location 1910 itself that make the potential location 1910 more or less desirable. As discussed above, this might be a building near the location (such as a gas station or a military base), an environmental factor (a rainy area might not be idea for an ATM), or a modifier based on how many people are proximate to a given location. The location score 1934 includes score modifiers (which may be positive or negative). Location score 1934 is also modified by Weight 2 so that in various use cases, location score 1934 may have an influence on the adjusted score 1930 that is larger or smaller, as desired.

The user score 1936 is a number that reflects at least one factor based on aspects of the users that make the potential location 1910 more or less desirable. Such users may be pedestrians, drivers, or passengers. As discussed above, this might include patterns in financial aspects associated with the users such as characteristics of financial transactions associated with the user or aspects of the overall wealth of users. Another user score 1936 might be based on social aspects of users, such as an organization affiliated with the users (such as a club or the military) or demographics such as age, gender, cultural characteristics, and so on. The location score 1934 includes score modifiers (which may be positive or negative). Location score 1934 is also modified by Weight 2 so that in various use cases, location score 1934 may have an influence on the adjusted score 1930 that is larger or smaller, as desired.

For example, example adjusted score 1940 provides an example of populating specific examples of information for such a score calculation. For example, example adjusted score 1940 corresponds to road #4 and nearby site #4. The adjusted score 1940 may be found (in this example) as the sum of a weight (1.0) times a traffic score (600 users/day) 1942 plus a weight (1.0) times a location score (which may be 200, due to being associated with a shopping center at site #4) 1944 plus a weight (1.0) times a user score (which may be 200, due to being associated with a high wealth user cohort) 1946. There may be multiple factors contributing to a location score 1944 or a user score 1946. While example adjusted score 1940 includes each weight as 1.0, different weights may change the effect of each term in the example adjusted score 1940 or help normalize various values.

A variety of information may be used to derive the user characteristic score modifier 1936. For example, the user characteristics could include information such as a wealth profile, a transaction history, a home address, salary information, a social profile, and an affinity group associated with the user characteristics. For example, such information may be stored for each user in a characteristic classifier characteristic database or another type of storage. The information may be transformed into a user characteristic score modifier by aggregating the information across groups of users near potential location 1910. For example, different values of information related to a wealth profile, a transaction history, a home address, salary information, a social profile, or an affinity group could be transformed into a modifier by aggregating them for the users that travel near the potential location 1910. An area associated with a group of users with a high wealth or salary, or a transaction history or an affinity group that would make a location a desirable location for that type of location may yield a value that is factored in when calculating a user characteristic score modifier 1936. For example, an ATM designed to serve military personnel would be suitable for a location near a military base and this situation would be reflected accordingly in the scoring.

For example, the method could begin with a value summarizing an aspect of the users. For example, that value or information could be a wealth profile, corresponding to an amount of money associated with an amount of users' assets. For example, a group of given users might have an average of $10,000,000 in total net assets. Such a value could be transformed into an associated classification, where each classification would have an effect on the user score 1936 corresponding to the users' wealth profile. For example, the wealth classification table might associate low wealth with a modifier of −200, average wealth with a modifier of 0, high wealth with a modifier of 200, and extreme wealth with a modifier of 400. These groupings might correspond to different levels of assets, based on the context of a particular system. For example, high wealth might correspond to users in a group with an average net worth of $5 million to $15 million.

In such an example, because the users under consideration have a net worth averaging $10 million, the users would be considered high wealth users. Thus, the modifier would be 200 based on the wealth profile, and the method would adjust the score based on the appropriate modifier and any weighting. For example, the user score 1936 could be partially based on the users' wealth profile and partially based on the users' salary, and the scores associated with these pieces of information could be weighted and combined accordingly, as desired.

FIG. 20 is an example diagram 2000 of a table that shows how a given building may affect the score for an area, based on whether the area is a candidate for a drive-thru ATM or a walk-in ATM, in accordance with an embodiment. The table shown in FIG. 20 corresponds to location score modifier 2010. The table also includes modifiers with respect to a drive-thru ATM 2012 and different modifiers with respect to a walk-in ATM 2014. The various modifiers indicate that a given location may make installing an ATM more or less desirable, and the effects of the location on the desirability differ when whether to install a drive-thru ATM 2012 or a walk-in ATM 2014.

For example, the table includes an entry 2020 for when the location is a gas station. In this case, the modifier is low (−100) 2022 for a drive-thru. The modifier is high (+200) 2024 for a walk-in. Further, the table includes an entry 2030 for when the location is a military. In this case, the modifier is low (−100) 2042 for a drive-thru. The modifier is medium (+100) 2044 for a walk-in. Further, the table includes an entry 2040 for when the location is a restaurant. In this case, the modifier is low (−100) 2042 for a drive-thru. The modifier is medium (+100) 2044 for a walk-in. Further, the table includes an entry 2050 for when the location is a shopping center. In this case, the modifier is very low (−200) 2052 for a drive-thru. The modifier is high (+200) 2054 for a walk-in. These modifiers may be considered as appropriate when scoring a candidate location in FIG. 19, such as at location score 1934.

FIG. 21 is an example diagram 2100 of a table and a formula that shows details of a way in which embodiments may account for levels of crime, in accordance with an embodiment. Column 2110 includes a type of crime, column 2120 includes a time at which the crime or crimes occurred, column 2130 includes a location identifier, column 2140 includes a number of occurrences, and column 2150 includes a severity rating associated with the type of crime. By including such information, the analysis of criminal activity can balance severity and frequency of crimes to establish a level of crime associated with a given location.

For example, row 2112 indicates that the crime in question is murder, that it occurred in the morning, that the murder occurred at a first location, that there was a single occurrence, and that the severity is high (1.0), given that murder is a very serious and violent crime. Row 2114 indicates that the crime in question is theft, that it occurred in the evening, that the theft occurred at a first location, that there were three occurrences, and that the severity is low (0.2), given that theft is a relatively minor property crime. Row 2116 indicates that the crime in question is robbery, that it occurred in the morning, that the robbery occurred at a second location, that there were two occurrences, and that the severity is medium (0.8), given that robbery is a moderately serious violent crime. Row 2118 indicates that the crime in question is assault, that it occurred in the evening, that the robbery occurred at the second location, that there were two occurrences, and that the severity is medium (0.7), given that assault is a moderately serious violent crime. The first and second locations could correspond to site #1 1730 and site #2 1732, but these are merely arbitrary, non-limiting examples. However, the nature of a site could have a relationship with observed crimes. For example, given that site #1 1730 is a gas station and site #2 1732 is a military base, there might be more robberies at site #1 1732.

Item 2160 shows a calculation of the threat score, made for location #1 2162 and a calculation of the threat score, made for location #2 2164. For example, the calculation made for location #1 2162 includes a threat based on crimes that occur in the morning and crimes that occur in the evening. Specifically, the calculation made for location #1 2162 reflects the murder 2112 that occurred in the morning and the thefts 2114 that occurred in the evening. Specifically, there was one instance of a murder 2112 with a severity of 1.0 and three instances of a theft 2114 with a severity of 0.2. The total crime for location #1 2162 is (1.0*1) or 1.0 for morning crimes and (0.2*3) or 0.6 for evening crimes. Location #1 2162 is associated with a crime score of 1.6.

Similarly, the calculation made for location #2 2164 includes a threat based on crimes that occur in the morning and crimes that occur in the evening. Specifically, there were two instances of a robbery 2116 with a severity of 0.8 and two instances of an assault 2118 with a severity of 0.7. The total crime for location #2 2164 is (0.8*2) or 1.6 for morning crimes and (0.7*2) or 1.4 for evening crimes, and thus location #2 2164 is associated with a crime score of 3.0.

There may be a threshold value for crime of 2.0. In item 2170, the crime threat score for location #1 of 1.6 is OK because it is less than or equal to 2.0, and the crime threat score for location #2 is not OK because it exceeds 2.0. In some cases, only one part of the day may be considered. For example, an ATM may be most used at night when a business is shut down and cash is required, so it may be most important that nighttime crime not exceed a threshold. FIG. 21 shows an example of how crime data in an area can be assembled and transformed to provide an overall metric of crime corresponding to an area. By comparing the metric to a threshold, it becomes possible to establish if the crime in an area is acceptable, or if an area includes so much crime that the area should be categorically barred from having an ATM be situated in the area because there is too much crime in the area. Alternatively, the metric could be incorporated into the scoring and weighted appropriately.

Figure 22:
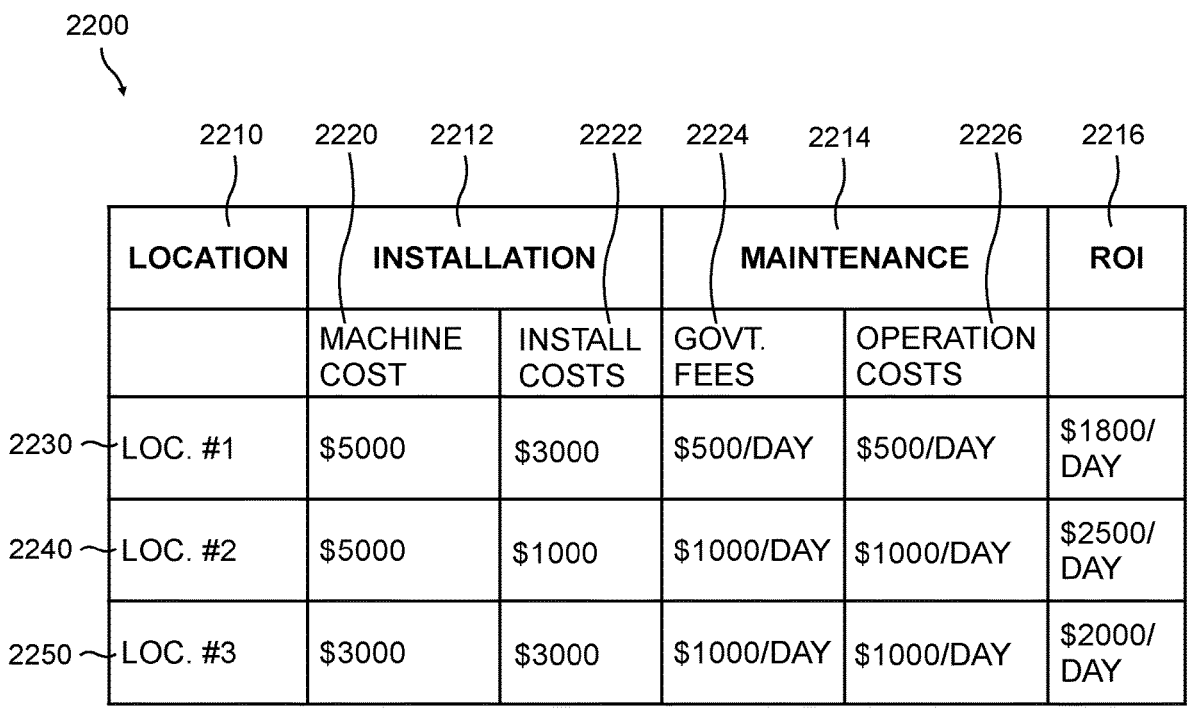
FIG. 22 is an example diagram of a table and a formula that shows details of a way in which embodiments may account for return on investment, in accordance with an embodiment.

FIG. 22 is an example diagram 2200 of a table and a formula that shows details of a way in which embodiments may account for return on investment, in accordance with an embodiment. Column 2210 provides for a location under consideration. For example, column 2212 provides for installation costs, and column 2214 provides for maintenance costs. For example, in FIG. 22, the installation costs 2212 may include machine costs 2220 and install costs 2222.

The maintenance losses 2214 may include government fees 2224 and operation costs 2226. However, FIG. 22 also shows, in column 2216 ROI, how much income the ATM should provide once operational. The table 2200 provides information for location #1 at row 2230, for location #2 at row 2240, and for location #3 at row 2250. These locations can correspond to appropriate locations in an electronic map as in FIG. 17.

For example, row 2230 shows that the machine cost is $5000, the install costs are $3000, the government fees are $500/day, and the operation fees are $500/day. These are only examples, and other fees could apply instead of or in addition to these fees. Row 2240 shows that the machine cost is $5000, the install costs are $1000, the government fees are $1000/day, and the operation fees are $1000/day. Row 2250 shows that the machine cost is $3000, the install costs are $3000, the government fees are $1000/day, and the operation fees are $1000/day. This information indicates initial and daily expenditures associated with the machine.

Column 2216 shows a Return on Investment (ROI) associated with each candidate location. For example, row 2230 shows a ROI of $1600/day for location #1. Row 2240 shows a ROI of $2500/day for location #2. Row 2230 shows a ROI of $2000/day for location #3. Items 2260, 2262, and 2264 summarize the profitability associated with locations #1, #2, and #3, respectively. For example, item 2260 indicates that location #1 is profitable after 10 days. There is an upfront cost of $8000, and location #1 has a profit of $800/day. Item 2262 indicates that location #2 is profitable after 12 days. There is an upfront cost of $6000, and location #2 has a profit of $500/day. Item 2264 indicates that location #3 is never profitable. There is an upfront cost of $6000, and location #3 has a profit of $0/day. Because the daily costs of operating an ATM at location #3 are never sufficient to pay for the upfront costs, location #3 will not be an appropriate location for an ATM (and will be reported electronically as an undesirable location based on the criteria built into the analysis and reporting system).

As indicated in item 2270, locations are viable or desirable based on a threshold for how soon a location is profitable and how profitable the location is. There might be a threshold that sets a standard for whether a machine has a sufficient ROI. For example, a threshold may specify that a location is to become profitable within 10 days. Then, location #1 might be acceptable, but not location #2, because it is profitable after 10 days rather than 12 days. In another example, a threshold may specify that a location must generate at least $600 in profit/day. Location #1 might be acceptable but not location #2 because it generates $800 profit/day rather than $500 profit/day. However, location #3 might never be acceptable, in that it generates no profit and never pays for its installation costs. Alternatively, an amount of profitability or a time before an ATM would be profitable could be weighted appropriately and used in the scoring process.

Figure 23:
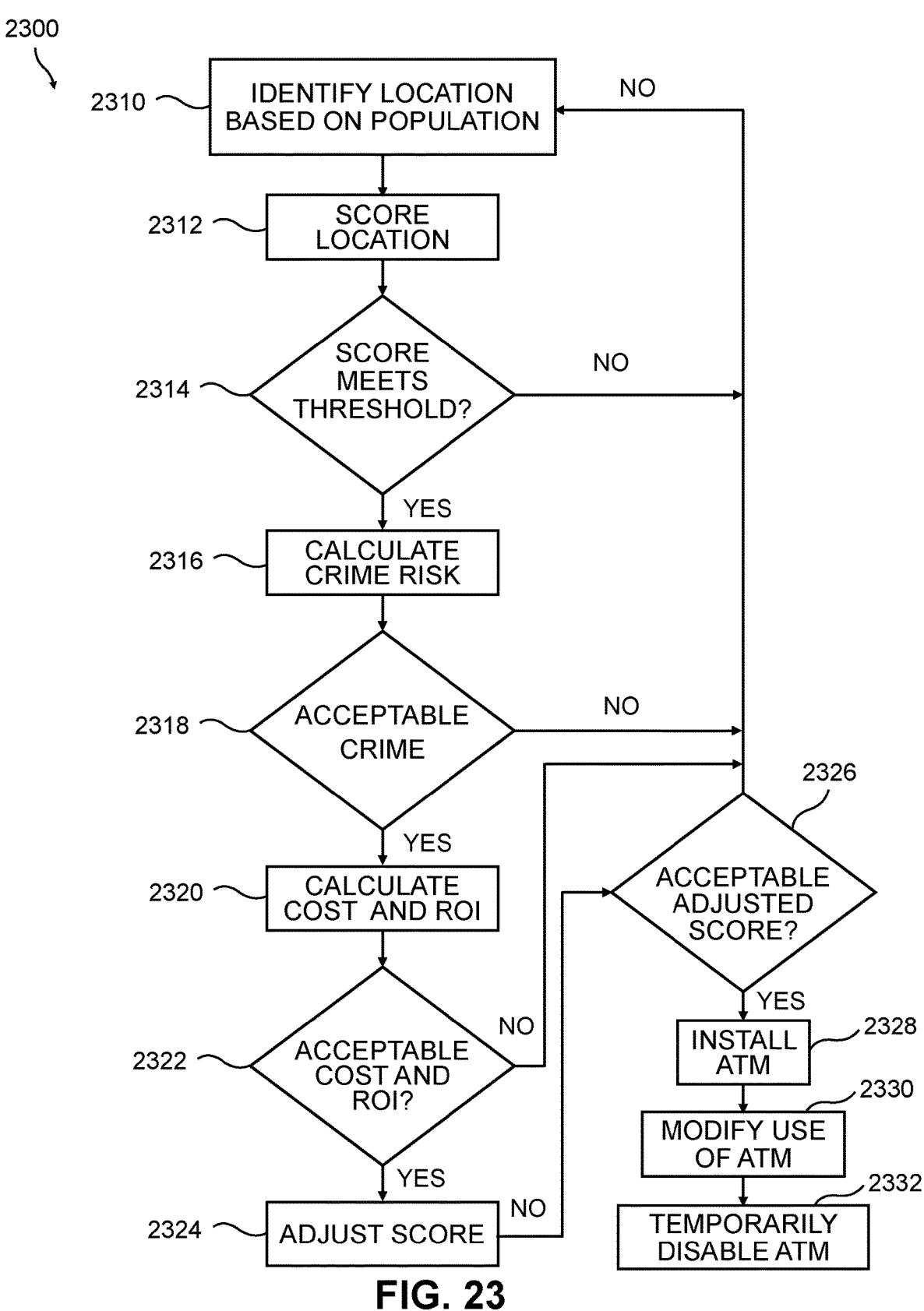
FIG. 23 is a flowchart of adjusting ATM placement scores and taking appropriate actions in response, in accordance with an embodiment.

FIG. 23 is a flowchart 2300 of adjusting ATM placement scores such as by using automated statistical and mathematical methods and taking appropriate actions in response (reporting desirable and undesirable locations), in accordance with an embodiment. In step 2310, the method identifies a potential location based on population information. Aspects of considering the population information are presented in FIGS. 1-2 and 5A-5D. Further, the method may gather population information from an electronic map as shown in FIG. 17. The gathering is further detailed in FIGS. 13 and 14. In step 2312, the method scores the potential location. In step 2314, the method determines if the score meets the threshold score to install an ATM at the given location. Further details of such scoring are presented in FIGS. 14-15. If the score does not meet the threshold, the location is not an appropriate location (and is recorded as such in the appropriate "ATM location database"—this could be a simple yes/no column in a typical electronic table) and the method returns to step 2310. If the score meets the threshold, the method may record the result—which could be recording a simple 1/0 indicator in a column in an electronic table or a field in a database record and then continues to step 2316 and calculates a crime risk for the location.

In step 2318, the method determines if the location is associated with an acceptable crime risk. Additional aspects of calculating a crime risk are presented in FIGS. 9A-9B, FIG. 10, and FIG. 21. If not, the method returns to step 2310. If so, the method continues to step 2320. In step 2320, the method calculates a cost and ROI associated with the location. In step 2322, the method determines if the calculated cost and ROI are acceptable. Additional aspects of considering a cost and an ROI are presented in FIG. 22. If not, the method returns to step 2310. If so, the method continues to step 2324. In step 2324, the method adjusts the score. In step 2324, the method may apply numerical adjustments to the score obtained in step 2312. In step 2326, the method may determine if the adjusted score is an acceptable adjusted score. If not, the method returns to step 2310. If so, the method continues to step 2328. In step 2328, the method installs the ATM. Additional aspects of such installation are presented in FIG. 12. The automated calculation results may be stored electronically in a database or table.

As the ATM operates, the method may perform additional automated analysis and reporting operations to adjust the operation of the ATM. For example, in step 2330, the method may modify use of the ATM. Such modification may change the features the ATM is allowed to implement or how the ATM operates. In step 2332, the method may temporarily disable the ATM. In these steps, the method may act to change what an ATM is capable of at certain times in order to improve the security of the ATM. For example, in step 2330, the method may set a cap on how much money may be withdrawn late at night, when the possibility of criminal activity is greater. In step 2332, the method may actually go further, and actually disable the ATM when there is a significant risk of a fraudulent transaction. For example, the ATM may detect signs of a fraudulent transaction and temporarily shut down.

The technology (statistical model, neural network, etc.) and data (acquired data, operational data, etc) used to calculate and inform a placement decision of an interactive machine (such as an ATM) may be updated as necessary. These placement decisions may admit of a different placement decision from that made previously. For example, travel patterns may change if a business is closed or relocated, traffic patterns change, and entertainment venues change in character. The technology and data then may be used to inform a lifecycle decision about the interactive machine. For example, a decision relating to whether to retire or remove an interactive machine already in place or whether to renew a lease on an existing location can be made with the input from this technology and data. The placement decisions may be adjusted also based on where actual real estate is located that is available to rent/lease. For example, an embodiment may determine to put an ATM in location A. However, there may not be leasable property at location A, but there may be leasable property across the street or next door that is available. This situation will require evaluation to determine which location is the best match.

For example, the methods and systems disclosed herein allow for users to access various types of information and receive updated information in real time, on request, or periodically, from various information sources to provide a way of optimally situating an interactive machine. However, the methods and systems provide for a combination of additional elements including gathering information facilitating the use of interactive technology in unconventional ways. Such information includes information about potential users and characteristics of potential locations that lead to the situation and subsequent maintenance of an interactive machine at an advantageous location. Thus, enabling more sophisticated and nuanced location analysis with the potential of creating competitive advantage and improved customer satisfaction.

For example, the methods and systems provide for storing the information, providing remote access to the information over a network, converting and aggregating the information from an assortment of various pieces of information for consideration about the placement of the interactive machine into a unified format, and automatically take action to install an interactive machine or regulate the functioning of an interactive machine that was already situated. The embodiments as a whole integrate the approaches for situating an interactive machine into a practical application of principles of situating the interactive machine. Further, these methods provide for consistent quality, transparent decisioning, and reproducible results for management consistency, regulatory reporting, and/or response to legal actions.

Specifically, the additional elements of embodiments recite a specific improvement over previous approaches for situating an interactive machine by allowing a system to gather multiple types of information, such as information about tracked user movements, information about criminal risk in an area, information about return on investment, available real estate, and other factors that modify the desirability of a potential location for an interactive machine that provide the ability to integrate information about an area to synthetically create a recommendation for the interactive machine that allows the interactive machine to be situated in an advantageous manner.

Moreover, embodiments may use information from various technologies sources and sensors in various ways that are advantageous when situating an interactive machine. For example, embodiments could track users with tags such as radio-frequency identification (RFID) tags, cameras and GPS tracking. However, the information used to track users is not limited to sensors that supply location data by tracking the users, and location data may also be supplied by accessing data for financial transactions conducted by users to indicate when users conduct transactions at given points in time. In addition to location information, users are associated with various characteristics that may be considered to indicate that an interactive machine would be placed to serve such a user.

These various types of information may be combined and integrated to create synthetically created recommendations that provide for suggested interactive machine locations that simultaneously consider various criteria that influence where an interactive machine should be situated. Embodiments automatically gather the information that is necessary to ensure that there will be sufficient demand for a given interactive machine, and modify that information to determine which locations for an interactive machine are most appropriate. For example, in addition to situating an interactive machine at a location where there will be many users or many transactions, it may be desirable to locate an interactive machine at a place where there is a building of a certain type nearby, or where there are users associated with certain characteristics. Once embodiments establish an appropriate location, real estate may be located that is available to lease. Then, embodiments use a message to instruct a user to install the interactive machine at the relevant location.

Furthermore, once an interactive machine has been situated, embodiments provide for functionality that ensures that the situation of interactive machines are kept up-to-date by automatically shutting down interactive machines that are no longer needed, adding new machines that become necessary as circumstances change. Embodiments also provide the ability to separately consider whether a possible interactive machine, which may be an ATM, should be a walk-in or a drive-thru ATM. For example, embodiments may separately acquire information about the activities of pedestrians and drivers in an area, and may use this information to establish which type of ATM is appropriate.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for installing an interactive machine at a selected location determined to be suitable for the interactive machine, the method comprising:

storing, by a processor, in a transaction memory location of a computer system, a minimum number of transactions having a value expected to be performed at the interactive machine;

identifying, by the processor, a number of potential users present in a first region based on information included in an electronic map of the first region;

identifying, by the processor, a first set of movements of the potential users present in the first region by using computer monitoring to report positions of the potential users at different points in time by tracking positions of mobile devices of the potential users using global positioning system information and positions of mobile devices of the potential users associated with electronic records of financial transactions performed by the potential users;

identifying, by the processor, a sub-region, selected from a plurality of candidate sub-regions of the first region to have a number of potential users sufficient to satisfy the minimum number of transactions;

providing, by the processor, a potential site for the interactive machine at a location within the sub-region, determined based on user density, determined from the electronic map of the first region including information about user densities associated with possible sites;

wherein the potential site is also determined based on converting information about situating the interactive machine based on usage patterns due to the potential site being within the sub-region, converting information about the user density to thereby place the interactive machine at a potential site associated with a sufficient usage, converting information about social profile information for the potential users, and converting constraints related to the social profile information to be satisfied by a potential site into a location for the potential site;

determining, by the processor, a type of interactive machine to install based on information from the electronic map associated with the potential site;

storing, by the processor, the potential site and the type of interactive machine to install for use in installing the interactive machine;

automatically generating, by the processor, a message containing information for installing the interactive machine of the stored type at the stored potential site;

transmitting, by the processor, the message to a user so that the user has access to the information for installing the interactive machine of the stored type at the stored potential site;

installing the interactive machine of the stored type at the stored potential site based on the information in the message, wherein the installation includes automatically controlling a mechanized vehicle, by the processor, to a cause the mechanized vehicle to perform the installation of the interactive machine at the stored potential site;

wherein the interactive machine is installed as a drive-thru machine or as a walk-in machine based on movement information from vehicles and movement information from pedestrians;

the method further comprising:

obtaining, by the processor, updated movements of the potential users present in the first region at a time subsequent to the first set of movements originally identified;

updating, by the processor, the electronic map of the first region based on the updated movements of the potential users present in the first region;

identifying, by the processor, changes in the updated electronic map of the first region;

based on the changes in the updated electronic map, determining, by the processor, whether at least one interactive machine at an existing location is still needed;

upon determining that the at least one interactive machine is not needed, the processor deactivates the at least one interactive machine; and upon determining that the at least one interactive machine is needed, the processor renews the at least one interactive machine at the existing location by sending a signal, code, or instruction to the at least one interactive machine that causes the at least one interactive machine to continue to operate.

2. The method of claim 1, further comprising identifying, by the processor, the sub-region as being a selected sub-region selected from the plurality of candidate sub-regions to have a number of potential users at a time of day sufficient to at least meet the expected minimum number of transactions for the time of day.

3. The method of claim 1, wherein the type of interactive machine is determined to be a drive-thru machine when the movements of the potential users indicate that vehicular traffic exceeds pedestrian traffic and wherein the type of interactive machine is determined to be a walk-in machine when the movements of the potential users indicate that pedestrian traffic exceeds vehicular traffic.

4. The method of claim 1, further comprising using the electronic map, by the processor, to perform at least one of indicating a location of the potential site, providing directions to the potential site, indicating a position for the interactive machine, activating the interactive machine, and confirming installation of the interactive machine.

5. The method of claim 1, wherein the type of interactive machine is determined to be a type of interactive machine that provides services related to the social profile information used to determine the potential site.

6. The method of claim 1, further comprising updating, by the processor, the potential site based on changes in movement patterns of the potential users and deactivating or moving the machine based on the updating.

7. A method for installing an interactive machine at a selected location determined to be suitable for the interactive machine, the method comprising:

storing, by a processor, in a transaction memory location of a computer system a minimum number of transactions having a value expected to be performed at the interactive machine;

identifying, by the processor, a number of potential users present in a first region based on information included in an electronic map of the first region;

identifying, by the processor, a first set of movements of the potential users present within the first region using computer monitoring of portable devices that report positions of the potential users at different points in time by tracking positions of mobile devices of the potential users using global positioning system information and positions of mobile devices of the potential users associated with electronic records of financial transactions performed by the potential users;

identifying, by the processor, from a crime storage location, a first area within the first region in which a risk of a crime event exceeds a threshold based on analyzing crime information;

storing, by the processor, in an investment memory, a minimum return on investment;

identifying, by the processor, a second area within the first region wherein a business cost exceeds a value that precludes achieving the minimum return on investment;

providing, by the processor, a potential site for the interactive machine at a location within the first region but outside of the first area and outside of the second area, determined from the electronic map of the first region, wherein the electronic map includes information about the potential sites;

wherein the potential site is also determined based on converting information about situating the interactive machine based on affinity group information for the potential users belongs and converting information related to satisfying constraints for the interactive machine based on usage patterns due to the site being within the first region, outside of the first area, outside of the second area, and determined based on the affinity group information to thereby place the interactive machine at a site associated with acceptable crime levels and acceptable return on investment into a location for the potential site;

determining, by the processor, a type of interactive machine to install based on information from the electronic map associated with the potential site;

storing, by the processor, the potential site and the type of interactive machine to install for use in installing the interactive machine;

automatically generating, by the processor, a message instructing a user to install an interactive machine at the potential site;

transmitting, by the processor, the message to the user to instruct the user to install, based on instructions contained in the message, the interactive machine of the stored type at the stored potential site;

installing the interactive machine of the stored type at the stored potential site based on the instructions contained in the message, wherein the instructions include one or more of text, video, and audio and are provided to the user using augmented reality or virtual reality technology to indicate to the user how to install the interactive machine;

wherein the interactive machine is installed as a drive-thru machine or as a walk-in machine based on movement information from vehicles and movement information from pedestrians;

the method further comprising:

obtaining, by the processor, updated movements of the potential users present in the first region at a time subsequent to the first set of movements originally identified;

updating, by the processor, the electronic map of the first region based on the updated movements of the potential users present in the first region;

identifying, by the processor, changes in the updated electronic map of the first region;

based on the changes in the updated electronic map, determining, by the processor, whether at least one interactive machine at an existing location is still needed;

upon determining that the at least one interactive machine is not needed, the processor deactivates the at least one interactive machine; and upon determining that the at least one interactive machine is needed, the processor renews the at least one interactive machine at the existing location by sending a signal, code, or instruction to the at least one interactive machine that causes the at least one interactive machine to continue to operate.

8. The method of claim 7, further comprising determining, by the processor, whether crime levels are acceptable by generating a crime score based on time, location, frequency, and severity of crimes and comparing the crime score to a threshold value.

9. The method of claim 7, further comprising determining, by the processor, whether return on investment achieves the minimum return on investment by determining profitability of the potential site and comparing the profitability to a threshold value.

10. A method for installing an interactive machine at a selected location determined to be suitable for the interactive machine, the method comprising:

storing, by a processor, in a transaction memory location of a computer system a minimum number of transactions having a value expected to be performed at the interactive machine;

identifying, by the processor, a number of potential users present in a first region based on information included in an electronic map of the first region;

identifying, by the processor, a first set of movement of the potential users present in the first region as a function of time using computer monitoring of portable devices that report positions of the potential users at different points in time by tracking positions of mobile devices of the potential users using global positioning system information and positions of mobile devices of the potential users associated with electronic records of financial transactions performed by the potential users;

identifying, by the processor, from a crime storage location in the memory a first area within the first region in which a risk of a crime event exceeds a threshold based on analyzing crime information;

establishing, by the processor, a minimum return on investment;

identifying, by the processor, a second area within the first region wherein a business cost exceeds a value that precludes achieving the minimum return on investment;

providing, by the processor, a potential site for the interactive machine at a location within the first region but outside of the first area and outside of the second area, determined from the electronic map of the first region, wherein the electronic map includes information about possible sites;

wherein the potential site is also determined based on converting information about situating the interactive machine based on social profile information of the potential users and converting information related to satisfying constraints for the interactive machine based on usage patterns due to the site being within the first region, outside of the first area, outside of the second area, and determined based on the social profiles for the potential users to thereby place the interactive machine at a site associated with acceptable crime levels and acceptable return on investment into a location for the potential site;

storing, by the processor, the potential site for use in installing the interactive machine;

automatically generating, by the processor, a message instructing a user to install an interactive machine at the potential site;

transmitting, by the processor, the message to the user to instruct the user to install, based on instructions contained in the message, the interactive machine at the stored potential site;

installing the interactive machine at the stored potential site based on the instructions contained in the message, wherein the instructions comprise at least one of: (1) guiding an automated installation by automatically controlling, by the processor, a mechanized vehicle to cause the mechanized vehicle to perform the installation of the interactive machine at the potential site, or (2) text, video, and audio provided to the user using augmented reality or virtual reality technology to indicate to the user how to install the interactive machine;

the method further comprising:

obtaining, by the processor, updated movements of the potential users present in the first region at a time subsequent to the first set of movements originally identified;

updating, by the processor, the electronic map of the first region based on the updated movements of the potential users present in the first region;

identifying, by the processor, changes in the updated electronic map of the first region;

based on the changes in the updated electronic map, determining, by the processor, whether at least one interactive machine at an existing location is still needed;

upon determining that the at least one interactive machine is not needed, the processor deactivates the at least one interactive machine; and upon determining that the at least one interactive machine is needed, the processor renews the at least one interactive machine at the existing location by sending a signal, code, or instruction to the at least one interactive machine that causes the at least one interactive machine to continue to operate.

11. The method of claim 10, wherein the potential site is associated with a score generated based on a number of potential users of the potential site and the score exceeds a threshold required for the potential site to be selected for installing the interactive machine.

12. The method of claim 11, further comprising accessing, by the processor, user characteristics for the potential users and using the user characteristics when generating the score for the potential site.

13. The method of claim 11, further comprising generating, by the processor, a score associated with a drive-thru machine for the potential location and a score associated with a walk-in machine for the potential location and installing a type of machine at the potential location associated with a higher score.

14. The method of claim 11, wherein the score is generated to be associated with a number of potential users of the potential site at a particular time of day.

15. The method of claim 11, further comprising considering, by the processor, a sub-region for the potential site and using a score modifier associated with the sub-region when generating the score for the potential site.

16. The method of claim 15, wherein the score modifier associated with the sub-region is based on a type of building included in the sub-region.

17. The method of claim 16, wherein the score modifier associated with the sub-region is different for the type of building for installing a drive-thru interactive machine and for installing a walk-in interactive machine.

18. The method of claim 11, wherein the score is a weighted sum of a quantity of users during a given time period, a sub-region score modifier, and a user characteristic score modifier.

19. The method of claim 11, further comprising updating, by the processor, the score to reflect changes to the movements of the potential users.

20. The method of claim 19, further comprising updating, by the processor, the score to reflect changes to at least one of the risk of the crime event, the business cost, the minimum return on investment, and the social profiles for the potential users.

* * * * *